May 23, 1950
C. M. KENDRICK
2,508,399
FLUID PRESSURE SYSTEM AND FLUID
FLOW CONTROL MEANS THEREFOR
Filed Nov. 9, 1943
4 Sheets-Sheet 1
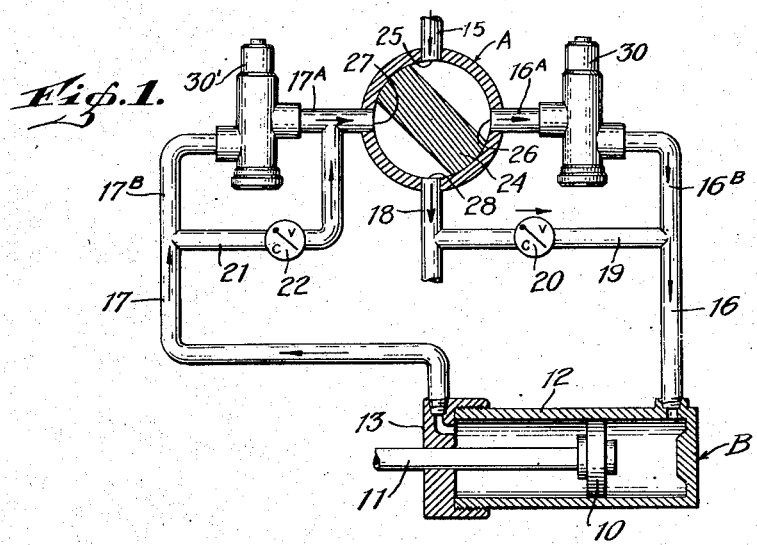
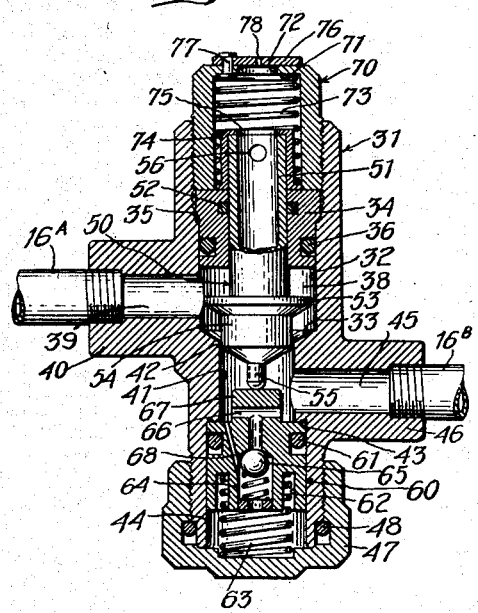
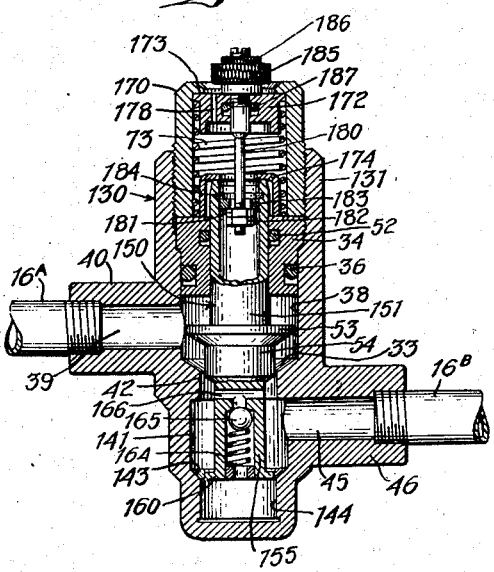
INVENTOR
CHARLES M. KENDRICK
BY Bartlett Eyre Keel & Weymouth
ATTORNEYS May 23, 1950    C. M. KENDRICK    2,508,399
FLUID PRESSURE SYSTEM AND FLUID
FLOW CONTROL MEANS THEREFOR
Filed Nov. 9, 1943      4 Sheets-Sheet 2
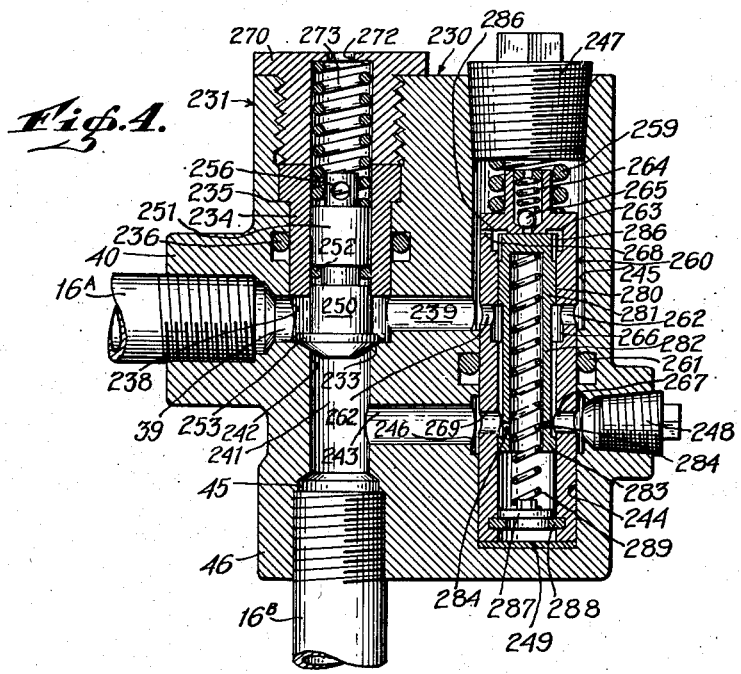
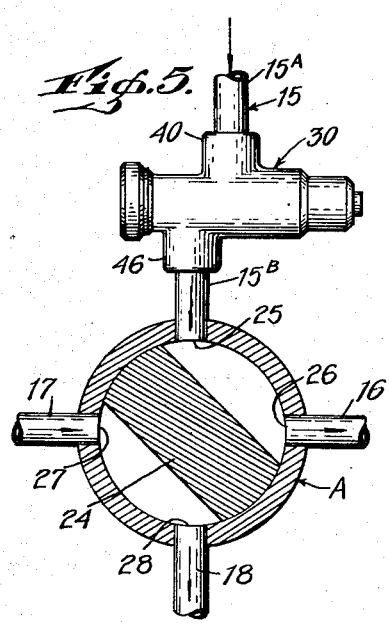
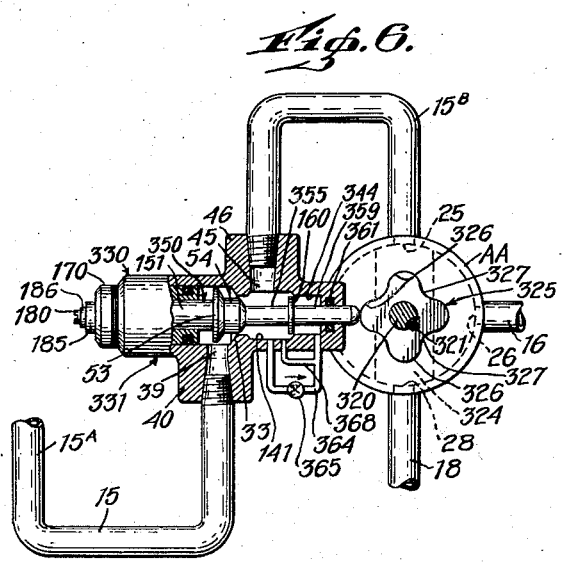
INVENTOR
CHARLES M. KENDRICK
BY Bartlett, Eyre, Keel & Weymouth
ATTORNEYS

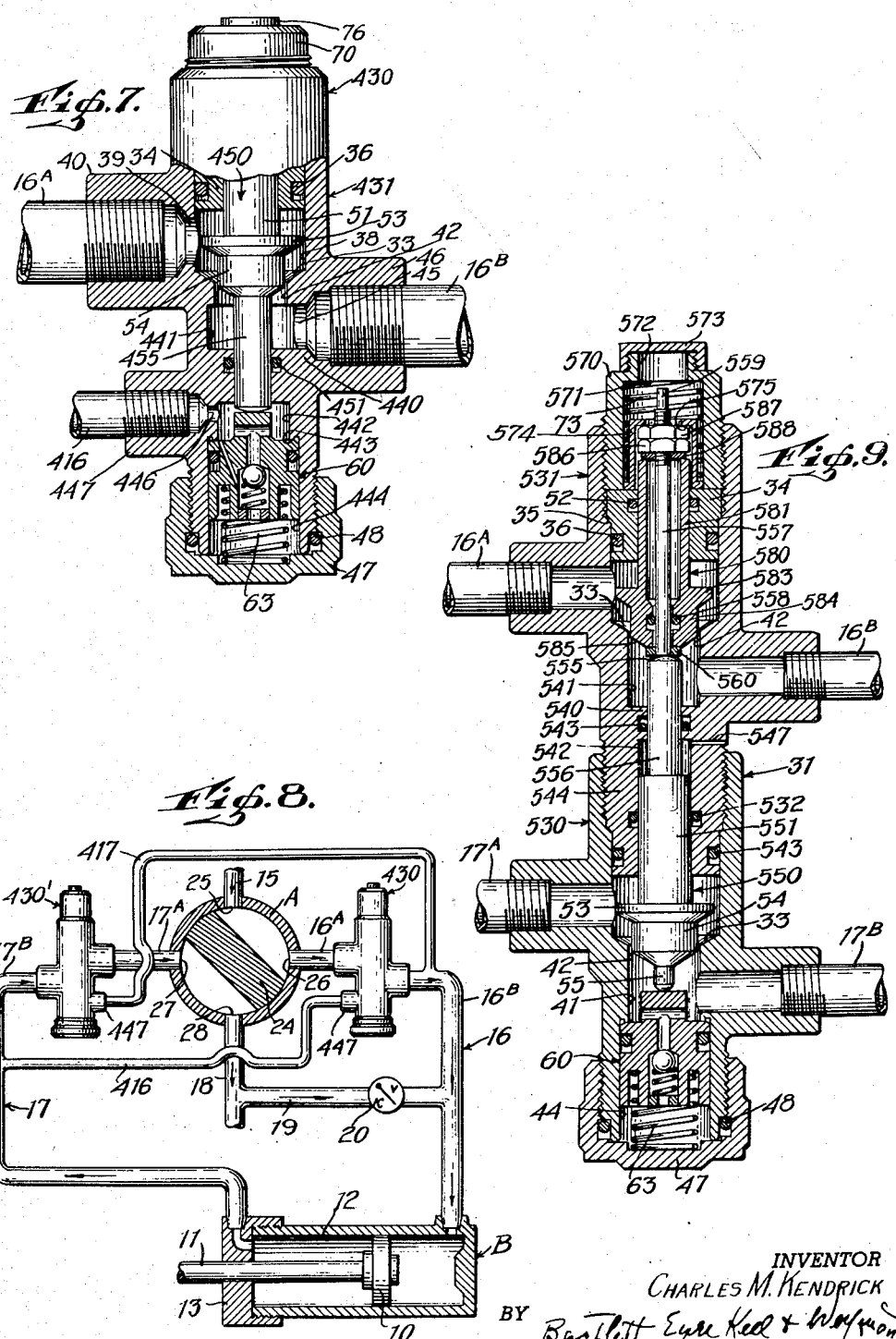

May 23, 1950

C. M. KENDRICK 2,508,399

FLUID PRESSURE SYSTEM AND FLUID
FLOW CONTROL MEANS THEREFOR

Filed Nov. 9, 1943

INVENTOR
CHARLES M. KENDRICK
BY
Bartlett Eyre Keel & Weinmouth
ATTORNEYS

Patented May 23, 1950

2,508,399

UNITED STATES PATENT OFFICE 2,508,399

FLUID PRESSURE SYSTEM AND FLUID FLOW CONTROL MEANS THEREFOR

Charles M. Kendrick, New York, N. Y., assignor to Manly Corporation, Washington, D. C., a corporation of Delaware Application November 9, 1943, Serial No. 509,575

46 Claims. (Cl. 121—47)

This invention relates to fluid pressure means and systems. It is concerned particularly with systems in which it is desirable to shut off the flow of fluid through a line when the pressure in a portion of said line is below a predetermined value, for example, in order to safeguard against material loss of the circulated fluid through escape thereof from the system in the event of rupture of a fluid conduit or other part of the system and the invention relates still more particularly to the means for safeguarding the system against such loss of its circulated fluid.

An important example of a fluid system of this character is an hydraulic system or circuit for aircraft use, and particularly for use in military aircraft. In such a system the rupture of a fluid conduit or other part of the system would, unless prevented, permit the escape of all the circulated fluid (except perhaps the small emergency supply), and hence might make it impossible to operate, particularly by power driven means, the hydraulically actuated devices in other and undamaged parts of the system, with consequent danger to the plane and its occupants. This hazard is widely recognized throughout the aircraft field and particularly in regard to military aircraft which is subject to enemy gun fire. The present invention accordingly will be described in connection with such use but it will be understood that the invention is not limited to this use, although particularly well suited therefor, and may be employed for any other suitable use and for use in connection with any suitable fluid as the circulated medium.

An object of the invention is to provide an improved system of the character mentioned, together with simple and improved means for limiting to a preferably relatively small and substantially predetermined amount, the volume of fluid that may escape in the event of rupture of a part of the system.

Another object is to provide an improved system of this character together with improved means for limiting the loss of fluid therefrom in the event of rupture of part of the system or circuit which is simple and reliable and which may be arranged to provide relatively little or no resistance to flow under normal operating conditions.

Other objects will appear from the description and explanation which follow:

The invention will be better understood from consideration of the accompanying drawings which illustrate by way of example several embodiments of the present invention.

In the accompanying drawings:

Fig. 1 is a diagrammatic view, partly in section, of a fluid system or circuit embodying the present invention;

Fig. 2 is an enlarged longitudinal sectional view of one of the elements, for convenience termed a circuit guard valve, of the system shown in Fig. 1;

Figs. 3 and 4 are enlarged sectional views illustrating modified forms of the circuit guard valve means according to the present invention;

Fig. 5 is a fragmentary diagrammatic view, partly in section, showing a modified arrangement of a portion of the fluid circuit or system of Fig. 1, but drawn to a scale different from that of Fig. 1;

Figure 10:
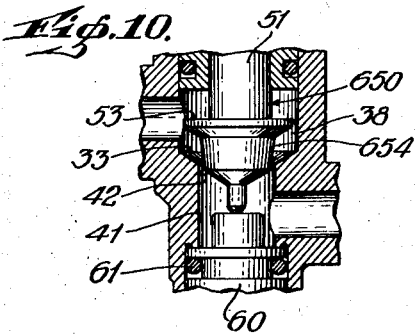
Figure 11:
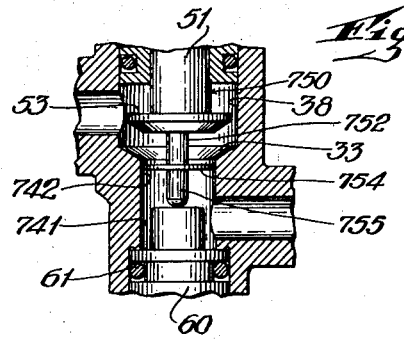
Figure 12:
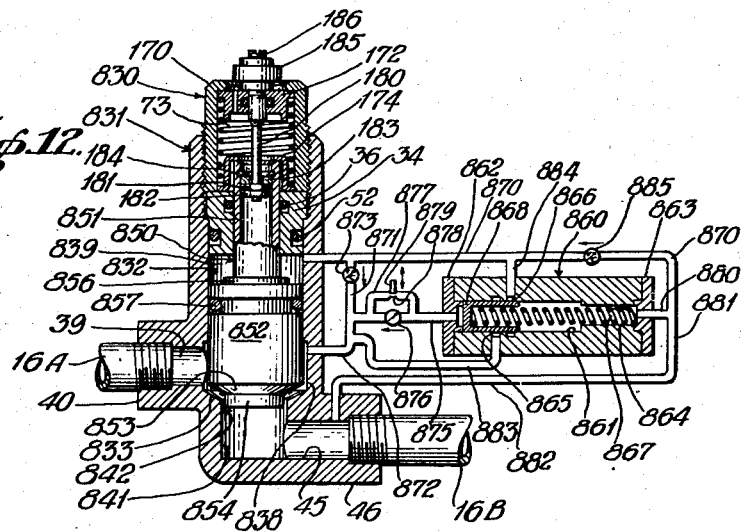
Figure 13:
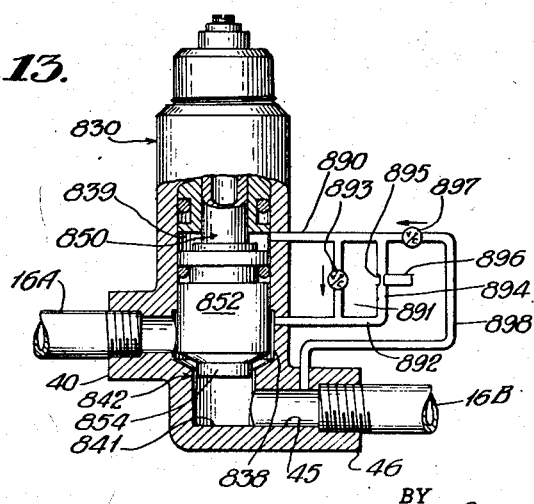

Fig. 6 illustrates, on an enlarged scale but different from that of Figs. 2 and 3, partly in section, another modified form of the circuit guard valve means according to the present invention, which is particularly suited for use in an inlet conduit leading to the selector or reversing valve, but not limited to such use, together with the schematically illustrated modified form of the cooperating selector valve means and certain portions of the fluid circuit;

Fig. 7 is an enlarged view drawn to substantially the same scale of Fig. 2, partly in longitudinal section, illustrating a further modified form of the circuit guard valve means according to the present invention;

Fig. 8 is a diagrammatic view, partly in section, showing the fluid system or circuit of Fig. 1 as modified when the circuit guard valve means of Fig. 7 are employed therein;

Fig. 9 is an enlarged longitudinal sectional view drawn to a scale substantially the same as that of Fig. 7, illustrating a still further modified form of the circuit guard valve means according to the present invention;

Figs. 10 and 11 are fragmentary views, partly in section, drawn to the same scale as that of Fig. 2 and illustrating modifications of the arrangement shown in Fig. 2;

Fig. 12 is an enlarged view, partly in section and partly diagrammatic, illustrating another modified form of the circuit guard valve means according to the present invention; and Fig. 13 is a view, partly in section, diagrammatically illustrating a modified arrangement for controlling a certain portion of the downward movement of the valve piston means of the modified circuit guard valve means of Fig. 12.

Referring now to these drawings, in Fig. 1, I have diagrammatically illustrated the present invention as embodied in a fluid system which includes a directional control or selector valve broadly designated by the letter A and a fluid motor broadly designated by the letter B. The motor B may be of any preferred type, such for example as a rotary fluid motor, but for convenience is here schematically illustrated as of the reciprocating type comprising a piston 10 reciprocable in a cylinder 12 and having a piston rod 11 extending through the cover member 13 of said cylinder 12 for connection to the device to be actuated thereby. Packing of any suitable type, not shown, may be used to prevent the leakage of fluid past the piston 10 and around the piston rod 11 in conventional manner.

Pressure fluid for actuating the motor B is supplied from any suitable source, not shown, through line or passage 15 which connects with the inlet port 25 of the selector valve A. The selector valve A is also provided with a pair of cylinder ports 26 and 27 respectively, which connect with a pair of lines or conduits broadly designated by the numerals 16 and 17 respectively, leading to the opposite ends of the cylinder 12. The selector valve A is further provided with an exhaust or return port 28 connecting with an exhaust line or passage 18 which may lead to a reservoir or the like, not shown. The selector valve A also includes a rotatable valve body 24 which, in the position in which it is shown in Fig. 1, connects the inlet port 25 with the cylinder port 26 and also connects the cylinder port 27 with the exhaust port 28, so that the flow of fluid through the system is then as indicated by the arrows in Fig. 1, the piston 10 of the motor B being moved toward the cover member 13. Rotation of the valve body 24 through 90° reverses the connections above described and causes the fluid to flow through the system in a direction opposite to that of the arrows in Fig. 1; the piston 10 of the motor B is then moved toward the closed end of the cylinder 12. Rotation of the valve body 24 through approximately 45° from the position in which it is shown in Fig. 1 cuts off communication between all of the ports of the selector valve A and hence stops and prevents movement of the piston 10 of the motor B.

The fluid system of Fig. 1 also includes two units of the improved means according to the present invention for limiting to a preferably relatively small and substantially predetermined amount the volume of fluid that may unintentionally escape in the event of rupture of certain parts of the system. These units, which for convenience are termed circuit guard valves, are designated by the numerals 30 and 30' respectively and are here shown as disposed in the conduits 16 and 17 respectively. These circuit guard valve means or units, when employed as here shown, are preferably disposed as close as possible to the selector valve A in order to provide protection against loss of fluid because of rupture of as much of the system as possible, as will be more fully understood from the further explanation which follows. The portions of the conduits 16 and 17 respectively intermediate the selector valve A and the units 30 and 30' respectively, for convenience are designated by the reference numerals 16A and 17A respectively, and similarly the portions of these conduits intermediate the circuit guard units 30 and 30' respectively, and the motor B are designated by the numerals 16B and 17B respectively.

The circuit guard valve units 30 and 30' are schematically shown in Fig. 1 as identical, although not necessarily so, and their construction and arrangement will be understood from consideration of the sectional view of the circuit valve unit 30 as shown in Fig. 2. Referring now to Fig. 2, circuit guard valve unit 30 includes a housing broadly designated by the numeral 31 having a longitudinal bore 32 which terminates at its inner end in a valve seat 33 of any suitable type or contour. The outer end of the bore 32 is provided with a gland 34 which is held against inward displacement by a shoulder 35 and is also held against outward displacement by a cap member 70 in threaded engagement with the enlarged outer end of the bore 32, suitable packing 36 being used to prevent the escape of fluid. The portion of the bore 32 intermediate the valve seat 33 and the inner end of the gland 34 is for convenience termed the chamber 38 and is suitably connected with the portion 16—A of the conduit 16 as by a transverse passage 39 in the boss 40. The housing 31 also includes a throat 42 for the valve unit which is disposed closely adjacent the valve seat 33 and connects with the bore 32. In the embodiment of Fig. 2, the throat 42 is of the same diameter as that of an intermediate chamber or bore 41, the upper end of which connects with the valve throat 42 and the lower end of which connects with a bore 44 of larger diameter which serves as the cylinder for the dash-pot piston 60 to be presently described. The bore 41 is suitably connected with the portion 16—B of the conduit 16, as by a transverse passage 45 in the boss 46. The lower end of the bore 44 is suitably closed as by a cap 47 here shown as in threaded engagement with the housing 31, suitable packing 48 being used to prevent the escape of fluid.

The circuit guard valve 30 of Fig. 2 also includes a valve piston broadly designated by the reference numeral 50 having a hollow stem portion 51 by which said valve piston 50 is slidably supported in the central opening of the gland 34, suitable packing 52 being used to prevent the leakage of fluid. The stem 51 terminates at its lower end in a head 53 which is disposed in the chamber 38 and which is adapted to engage the valve seat 33 in fluid tight engagement therewith when the valve piston 50 occupies its extreme inward or fully closed position. A cylindrical shoulder 54 extends downwardly from the head 53 and terminates in a reduced end portion 55 of the valve piston 50, the arrangement being such that said end portion 55 is in contact with the upper end of the dash-pot piston 60 when the parts are in the position illustrated in Fig. 2, as clearly shown by this drawing. The shoulder 54 is made of a diameter greater than the diameter of the stem 51 but somewhat less than the diameter of the throat 42 of the valve unit, for a purpose to be later explained.

The circuit guard valve unit 30 also includes a dash-pot piston 60 which is slidably disposed in the bore 44 and is here shown (Fig. 2) as provided with suitable packing 61 to prevent the escape of fluid past the dash-pot piston 60 from the outer end of the bore 44, that is to say, from the end of said bore 44 intermediate said dash-pot piston 60 and the cap 47. A spring 63 urges the dash-pot piston 60 toward its extreme inward position in the bore 44, in which position said piston 60 is shown in Fig. 2, where its further inward movement is prevented by the shoulder 43 at the inner end of the bore 44, said spring 63 extending into an annular recess 62 formed in said dash-pot piston 60.

A fluid connection under control of a one-way check valve is also provided between the bore 41 and the outer end of the bore 44. This fluid connection and check valve may be of any suitable arangement but it is frequently convenient to make the arrangement such that they are disposed in the dash-pot piston 60, as in the present instance, the latter arrangement frequently having the advantages of compactness and low weight which are of importance particularly for aircraft use. The dash-pot piston 60 is accordingly shown in Fig. 2 as provided with a central longitudinal passage broadly designated by the numeral 64, which passage contains a check valve broadly designated by the numeral 65, the upper end of the passage 64 being of reduced diameter and connecting with a transverse passage 66 in the reduced end portion 67 of the valve piston 60. With this arrangement fluid may pass through the passages 66 and 64 into the outer end of the bore 44 but the check valve 65 prevents the passage of fluid in the opposite direction; the check valve 65 is preferably made such as to present very little resistance to the passage of fluid into the outer end of the bore 44 in order that fluid may freely pass into said outer end of said bore 44 whenever the pressure therein is less than the pressure in the bore 41.

A restricted and always open fluid connection is also provided between the outer end of the bore 44 and the bore 41 and this likewise may be of any preferred suitable arrangement; for example, this restricted passage might be provided by limited clearance between the bore 44 and the dash-pot piston 60 with the packing 61 omitted. As shown in Fig. 2, however, this restricted connection takes the form of a small passage 68 formed in the dash-pot piston 60 and connecting with the passage 64 at a point lower than the position of the check valve 65, it being understood that this passage 68 is here intended to represent all restricted connections suitable for the purpose to be later explained.

The valve piston 50 of the circuit guard valve unit 30 is arranged to be biased toward the position in which it is shown in Fig. 2 and to be moved into this position whenever the pressure in both the chamber 39 and the bore 41 are at or below predetermined values. As shown in Fig. 2, two springs are employed for this purpose in the circuit guard valve unit 30, one of these springs being the spring 63 which, as already explained, urges the dash-pot piston 60 toward its extreme inward position of Fig. 2, said spring 63 also acting through said dash-pot piston 60 to urge the valve piston 50 toward its position of Fig. 2 whenever said valve piston 50 occupies a lower position. A second spring 73, disposed in the interior of the cap member 70, acts to urge the valve piston inward to the position of Fig. 2 whenever said valve piston 50 occupies a higher position, but said spring 73 does not urge said valve piston 50 to a position lower than that of Fig. 2. For this purpose the outer end of the spring 73 acts against the end 71 of the cap member 70 and the inner or lower end of said spring 73 acts against an abutment piece or spring retaining cup 74 which surrounds the upper end of the stem 51 of the valve piston 50, the cup 74 having an internal flange or shoulder 75 arranged to engage the upper end of the stem 51. The spring 73 may thus urged the cup 75 and hence the valve piston 50 downward toward the position of Fig. 2 whenever said cup and piston occupy positions upward with respect to their positions in Fig. 2 but the lower end of the cup 75 comes into contact with the upper end of the gland 34 when this position of the cup and piston is reached, thus limiting the extent to which said cup and piston may be urged or moved inward by said spring 73.

With the arrangement of Fig. 2 as above described, the valve piston 50 will be moved into the position in which it is shown in Fig. 2 whenever the conduit 16 is connected with the return conduit 18 (and after exhaust of fluid through the conduit 16 has ceased), hence said valve piston 50 will always occupy this position when the valve body 24 of the selector valve A is turned to establish fluid connection between the inlet conduit 15 and said conduit 16. Pressure fluid entering the conduit 16 first passes into the chamber 38 of the circuit guard valve unit 30, the passage of this fluid, which is frequently a liquid, such, for example, as oil, encountering substantially little or no resistance to flow up to this point. With the valve piston 50 in its position of Fig. 2, however, the shoulder 54 thereof extends into the throat 42 of the valve unit and hence provides a restricted connection between the chamber 38 and the bore 41, this restricted connection presenting resistance to flow therethrough with respect to the full volume of fluid admitted to the conduit 16 but said restricted connection permitting some fluid to pass into the bore 41. This restricted connection in the present instance thus comprises the space between the shoulder 54 and the throat 42 of the valve unit and it will be understood that any suitable form of restricted connection may be employed between the chamber 38 and the bore 41 during the interval of the retarded downward movement of the valve piston 50 from its position of Fig. 2, to be presently described, or during a corresponding interval.

If the portions of the circuit or system intermediate the throat 42 and the piston 10 of the motor B are filled with fluid, as will normally be the case, and if these portions of the circuit are intact (i. e. free from rupture), the pressure fluid passing into the bore 41 through this restricted connection will almost immediately build up pressure therein which will act upon the lower end of the valve piston 50 and move the latter against the resistance of the spring 73 into said valve piston's extreme upper or fully open position, where it will present little or no resistance to the flow of fluid through the valve unit 30. As clearly shown in Fig. 2, the upper end of the stem 51 of the valve piston 50 is exposed to atmospheric pressure, this being assured in the present instance by the hole 78 in the disk member 76 which will be later described. The valve piston 50 will remain in its uppermost position as long as the pressure in the chamber 38 and in the bore 41 exceed the value determined by the spring 73, irrespective of the volume of fluid passing through the valve unit 30 and irrespective of the time that such pressure exists.

If the portion of the system intermediate the throat 42 of the valve unit and the piston 10 of the motor B is not filled with fluid (as because of leakage from this portion of the circuit due to rupture thereof or otherwise) at the time that pressure fluid is first admitted to the chamber 38, the fluid that immediately passes through the restricted connection between the chamber 38 and bore 41 will be unable to immediately build up pressure in said bore 41. Under this condition the valve piston 50 will be urged downward toward the seat 33 by action of the pressure fluid on the upper side of the head 53, the pressure of the fluid in said chamber 38 being brought about by resistance to flow presented by the restricted connection between said chamber 38 and the bore 41. The downward force thus exerted on the valve piston 50 is equal to the force exerted by the pressure fluid in the chamber 38 upon an area equal to the difference between the cross-sectional area of the shoulder 54 and the cross-sectional area of the stem 51. In this connection it will be recalled that the diameter of the shoulder 54 is greater than that of the stem 51 but less than that of the throat 42 of the valve unit, and the reason for these relative proportions will now be understood. The hydraulically-imposed downward force just described thus acts to move the valve piston 50 downward but such movement is resisted by dash-pot action of the dash-pot piston 60 which can be moved downward by said valve piston 50 only as rapidly as permitted by the escape of fluid through the restricted passage 68 in said dash-pot piston 60. A controlled interval is thus provided between the time that the valve piston 50 commences its downward movement from its position of Fig. 2 and the time that said valve piston 50 reaches its extreme downward position in which the head 53 engages the seat 33 to cut off all fluid connection between the chamber 38 and the bore 41, and during this interval fluid continues to pass into the bore 41 through the restricted connection between the throat 42 and shoulder 54. The volume of fluid thus permitted to pass into the bore 41 after the valve piston 50 starts the above mentioned downward movement is determined by the size of the restricted connection between the chamber 38 and bore 41 and also by the size of the restricted passage 68 in the dash-pot piston 60, and hence may be made substantially any desired amount.

The maximum volume of fluid which is permitted to pass into the bore 41 during the interval of the retarded downward movement of the valve piston 50 will thus be a substantially predetermined amount and this will be the case, closely approximately if, indeed, not exactly, under all operating conditions. In this connection it may be pointed out that the pressure in the lower end of the bore 44 intermediate the dash-pot piston 60 and the cap 47 is determined by the force exerted upon said dash-pot piston 60 by the valve piston 50, and the pressure existing in said outer end of said bore 44 determines in part the rapidity with which fluid will pass outward therefrom through the restricted passage 68; the spring 63 presents, of course, some resistance to downward movement of the dash-pot piston 60 but considerably less than is imposed by the fluid in the outer end of said bore 44 in the preferred arrangement. The downward force exerted on the dash-pot piston 60 by the valve piston 50 is in turn determined, however, by the pressure existing in the chamber 38 which pressure also determines the rapidity with which fluid will pass through the restricted connection between said chamber 38 and said bore 41. A relation thus exists between pressures in the chamber 38 and in the outer end of the bore 44, although the pressure in the latter will be considerably lower than the pressure in the former in the arrangement of Fig. 2. Change in fluid pressure in the chamber 38 will thus result in corresponding change in the pressure of the fluid in the outer end of the bore 44, so that the rapidity with which fluid of any given viscosity can be exhausted from the outer end of said bore 44 through the restricted passage 68 will change correspondingly with the rapidity with which fluid is passing from the chamber 38 into the bore 38 through the restricted connection therebetween. Similarly, change in viscosity of the fluid will simultaneously and correspondingly (although not necessarily exactly) change the resistance to passage thereof through the restricted passage 68 and the restricted connection between the chamber 38 and bore 41 respectively. The maximum volume of fluid permitted to pass into the bore 41 during the interval of retarded downward movement of the valve piston 50 from its position of Fig. 2 until said valve piston 50 reaches its extreme downward position may thus be limited to practically any substantially predetermined amount by proper proportioning of the several cooperating parts and passages, but such maximum volume is preferably kept as small as practical in the individual case, and frequently this will be very small, but said maximum volume is always preferably relatively small in relation to the total available supply of fluid.

If the portion of the system intermediate the throat 42 of the valve unit 30 and the piston 10 of the motor B has been ruptured at any point therein, as by a bullet or otherwise, the fluid passing into the bore 41 during the above described interval of retarded downward movement of the valve piston 50 will be unable to build up pressure in this portion of the system and hence the valve piston 50 will move to its extreme downward position so that the head 53 comes into engagement with the seat 33 and prevents the further passage of fluid through the valve unit 30. The volume of fluid that may be unintentionally lost under these conditions is thus limited to the amount passing from the chamber 38 into the bore 41 through the restricted connection therebetween during the above mentioned interval and the system is safe-guarded against further unintentional fluid loss. But if there has merely been leakage out of the portion of the system above mentioned, the fluid passing into the bore 41 will replenish the supply of fluid therein and will then almost instantly build up pressure in the bore 41 which will act on the lower or inner end of the valve piston 50 and move said valve piston into its extreme upper position, in the same manner as if this part of the system had been completely filled with fluid at the time of admission of pressure fluid to the chamber 38. It may also be pointed out here that the valve piston 50 will be reset to its position of Fig. 2 upon connection of the conduit 16 with the return conduit 18, and such resetting will recur each time that this connection is reestablished. For example, if the valve piston 50 is in its extreme upper or fully open position at the time the connection is established between the conduits 16 and 18, the spring 73 will act to instantly move said valve piston 50 downward into its position of Fig. 2. If, however, the valve piston 50 then occupies its extreme downward position or any position below that of Fig. 2, said valve piston 50 will be instantly moved upward to its position of Fig. 2 by the spring 63 acting through the dash-pot piston 60, so that both pistons will be restored to their positions of Fig. 2. Upon such upward movement of the dash-dot piston 60 the check valve 65 opens to permit fluid to quickly enter the outer end of the bore 44 so that upward movement of the dash-pot piston 60 may be very rapid, and it is for this reason that the check valve 65 is provided. The pilot or operator may thus reset the valve piston 50 to its position of Fig. 2 as many times as desired by merely turning the valve body 24 of the selector valve A to establish connection between the conduits 16 and 18, and for each such setting or resetting the guard valve unit 30 will permit the substantially predetermined volume of fluid to pass into the bore 41 unless pressure is built up therein to open the valve by moving the valve piston 50 to its extreme upper position, and the pilot may thus cause the admission of as much fluid as desired into the portion of the system intermediate the throat 42 and piston 10 of the motor B, with the result that movement of said piston 10 may be provided under almost all conditions in which the system is intact or the pilot may assure himself that failure of the motor B to respond is due to rupture of the system or the like and not merely to excessive leakage of fluid therefrom. In many instances, therefore, the arrangement may be made such that the maximum volume of fluid passing into the bore 41 during the above described retarded downward movement of the valve piston 50 is merely enough to replenish normal leakage from the system due to defective packings or the like, and this amount can be made very small in many instances. This is the preferred arrangement but it will be understood that this maximum volume may be made of any desired amount as preferred or as occasion may indicate to be advisable.

If rupture occurs in the portion of the circuit intermediate the valve seat 33 and the piston 10 of the motor B during the time that the inlet conduit 15 is connected with the conduit 16, the pressure in said conduit 16 will drop and the valve piston 50 will first be moved to its position of Fig. 2 by the spring 73, after which it will move downward, at the relatively retarded rate of movement determined by the dash-pot piston 60, until the head 53 comes into engagement with the valve seat 33 and cuts off all fluid communication between the portions 16—A and 16—B of the conduit 16. The substantially predetermined fluid volume will pass through the circuit guard valve unit 30 during this interval of relatively retarded downward movement of the valve piston 50, as already explained, but fluid loss from the system will be limited to substantially this amount.

The circuit guard valve unit 30 of Fig. 2 thus protects the system against excessive and unintentional loss of fluid in the event of rupture of some point intermediate the throat 42 and piston 10 of the motor B, but assures operation of the motor B if the system is in good order.

In some instances there may be a tendency for the actuated member attached to the piston rod 11 of the motor B to move the piston 10 thereof more rapidly than said piston can be moved by the pressure fluid admitted to the cylinder 12 from the source of such pressure fluid, with the result that such movement or overrun of the piston 10 would tend to create a vacuum in the part of the circuit connected with the intaking side of the motor B and the latter condition might also tend to retard such overrunning movement of the piston 10 which might not be desirable. An instance of this kind is found in connection with the hydraulic motors employed to retract and extend the landing gear of some aircraft, in which gravity action tends to extend the landing gear into proper position for landing and in which it is frequently desirable that said landing gear be permitted to move toward or into its fully extended position as freely and as rapidly as possible under such gravity action. For purposes of illustration, let it be assumed that the motor B of Fig. 1 is employed to actuate such aircraft landing gear and that the arrangement is such that movement of the piston 10 thereof toward the cover member 13 is the direction of its movement to extend the landing gear into position for landing, and also that said landing gear under gravity action tends to move into this position more rapidly than such movement can be effected by action upon the piston 10 of the pressure fluid admitted through the conduit 16 to the cylinder 12 so that said piston 10 tends to overrun. In such instances and as illustrated in Fig. 1, I preferably provide a connection, such as the passage 19, between the return conduit 18 and the portion 16—B of the conduit 16, with a check valve 20 therein arranged to permit fluid to pass freely through said passage 19 into said portion 16—B but preventing the passing of fluid in the opposite direction. With this arrangement when overrun of the piston 10 tends to create a vacuum in the conduit 16, fluid will pass into the portion 16—B thereof as rapidly as required to keep said conduit completely filled so that there will be no cavitation in this part of the system. The circuit guard valve unit 30 is then preferably made such that the interval of retarded downward movement of the valve piston 50 from its position of Fig. 2 is somewhat longer than the maximum time in which overrun of the piston 10 of the motor B can take place. The fluid passing into the bore 41 during this interval will almost instantly build up the pressure required to move the valve piston 50 upward, to thereby fully open the circuit guard valve 30, as soon as overrun of the piston 10 ceases and said piston 10 will then continue its movement substantially without interruption under action of the pressure fluid admitted to the cylinder 12 through the conduit 16. This arrangement also provides added safety in the event of failure of the entire hydraulic system as it permits the piston 10 to move freely under gravity action of the landing gear due to the ready admission of fluid to the intaking side of the cylinder 12, thus permitting substantially free extension movement of the landing gear under gravity action.

Up to this point the action of the circuit guard valve 30 has been considered only from the standpoint of flow of the fluid from the selector valve A to the motor B. In the reverse direction of flow, the valve piston 50 of the valve unit 30 will be moved upward from its position of Fig. 2 by action of the fluid exhausted by the motor B upon the lower or inner end of said valve piston 50. In order to keep the back pressure as low as possible, the arrangement is preferably made such that the valve piston 50 will be moved toward or into its extreme upper position by action on the inner end thereof of fluid having a pressure equal to or less than the back pressure caused by flow of the exhausted fluid through the selector valve A, this being accomplished by proper proportioning of the parts, including the spring 73. In some instances, however, it may be desired to make the arrangement such that a relatively high pressure, in excess of the normal back pressure caused by flow of the exhausted fluid through the selector valve A, is required to move the valve piston 50 upward from its position of Fig. 2 into its uppermost position, yet it may also be desired to avoid the consequently high back pressure that would result when fluid is exhausted through the circuit guard valve under this condition. In such instances a by-pass line, including a check valve, may be provided around the circuit guard valve. An arrangement of this character is illustrated in connection with the circuit guard valve 30' of Fig. 1, in which the by-pass line 21 is provided around said valve unit 30', said by-pass line 21 being provided with a check valve 22 which permits fluid to pass therethrough toward the selector valve A but prevents fluid flow therethrough in the opposite direction.

The valve piston 50 of the circuit guard valve unit might tend to interfere with filling or bleeding of the circuit or system and means are accordingly provided by which said valve piston 50 may be held in its extreme upper position during these operations or whenever so desired. As shown in Fig. 2, the hollow stem 51 of the valve piston 50 is provided with one or more radial holes 56 into which a suitably formed hook may be inserted, and for this purpose the end 71 of the cap 70 is provided with a hole 72 through which said hook may be passed. As also shown in Fig. 2, the shoulder or flange 75 of the cup 74 terminates adjacent the inner circumference of the hollow stem 51 and hence does not interfere with the insertion of the hook. A disk 76 covers the hole 72 in the cap 70 and is suitably attached to said cap 70 as by means of a post 77 upon which said disk may be pivotally mounted.

The circuit guard valve 30 according to the present invention has many advantages, some of which have already been pointed out. Among these are its simplicity, compactness and dependability. Another is its light weight which is particularly important for aircraft use, and circuit guard valve units for this purpose may be constructed so that the weight of each is only a few ounces.

Fig. 3 illustrates a modified form of the circuit guard valve according to the present invention which will answer requirements in many instances and may be preferred because of its somewhat smaller size and correspondingly lighter weight. As illustrated in Fig. 3 the modified valve unit 130 is shown as connected with the portions 16—A and 16—B of the conduit 16 of Fig. 1, although it can also be used in place of the valve unit 30' of Fig. 1 or elsewhere in the circuit as will be later explained. In this instance the spring 73 is alone employed to urge the modified valve piston 150 toward its position of Fig. 3 and to reset said valve piston to this position whenever the conduit 16 is connected with the return conduit 18. For this purpose the modified cap member 170 is provided at its outer end with an annular flange 173 which acts as a stop for an abutment piece 172 at the outer end of the spring 73, the arrangement being such that said abutment piece 172 may move inward with respect to said flange. The inner end of the spring 73 bears against a cup member 174 generally similar to the spring retaining cup 74 of Fig. 2, though of different proportions.

A rod 180 extends through the central opening in the abutment piece 172 and projects into the hollow stem 151 of the valve piston 150. The inner end of the rod 180 is threaded to receive a nut 181 and a jam or lock nut 182 and the nut 181 is arranged to bear against a washer 183 which in turn bears against a retaining ring 184 which is snapped into a suitable groove in the stem 151. The outer end of the rod 180, here shown as of larger diameter than the inner end thereof, is likewise threaded to receive a preferably knurled nut 185 and a jam or locking nut 186 and these nuts are so adjusted that the nut 185 is in contact with the abutment piece 172 when the parts are in the position shown in Fig. 3. A rubber ring 187 or other suitable friction or locking device is provided to hold the rod 180 against unintentional movement with respect to the abutment piece 172; as the ring 187 might tend to form a seal around the rod 180 and thus prevent the entry of air, the abutment piece 172 is also provided with a hole 178 to assure that the outer end of the valve stem 151 is exposed to atmospheric pressure. With this arrangement upward movement of the valve piston 150 from its position of Fig. 3 merely raises the cup 174 and compresses the spring 73 toward the abutment piece 172, said abutment piece 172 and the rod 180 remaining stationary. Upon downward movement of the valve piston 150 from its position of Fig. 3, the washer 183 engages the nut 181 so that the rod 180 is moved downward, causing similar downward movement of the abutment piece 172 and compressing the spring 73 toward the cup member 174.

The rod 180 and its associated parts may also be employed to move and hold the valve piston 150 above its position of Fig. 3 during filling or bleeding of the circuit, etc. To move the valve piston upward from its position of Fig. 3, the mechanic merely grasps the nut 185 and pulls the rod 180 outward, the valve piston 150 being moved outward correspondingly by nuts, etc., at the inner end of said rod 180. After the filling, bleeding or other operation is completed, the nut 185 or rod 180 is pushed inward so that the parts resume their position of Fig. 3.

The modified valve piston 150 is also provided with a head 160 which serves as the dash-pot piston in this embodiment and is arranged to enter the bore 144 which is closed on its outer end and which serves as the dash-pot cylinder. As shown in Fig. 3, the arrangement is such that the head 160 just begins to enter the bore 144 when the parts are in the position of Fig. 3 in order to permit the valve piston 150 to be moved downward to this position quickly and also to assure that the dash-pot action will produce the desired interval of retarded downward movement of the valve piston 150 as said valve piston is moved downward from its position of Fig. 3. For the same reason the modified chamber or bore 141 of the modified housing 131 is here shown as of larger diameter than that of the bore 144 and the two bores are preferably joined by a tapered portion 143. For purposes of assembly the diameter of the head 160 is made just slightly smaller than the diameter of the throat 42 of the valve unit and the arrangement is also preferably such that the head 160 does not project above the lower side of the passage 45 when the valve piston 150 is in its uppermost position in order not to interfere with the flow of fluid into said passage 45.

Any suitable form of restricted passage between the bores 141 and 144 may be employed in order to provide a restricted path of escape for the fluid in the outer end of the bore 144 in order to provide dash-pot action as the head 160 moves downward therein to the desired interval of retarded downward movement of the valve piston 150 from its position of Fig. 3 to its fully closed position. For example, this restricted passage might take the form of a hole through the head 160 or other parts of the structure. As here shown, however, a small clearance is provided between the circumference of the head 160 and the bore 144 and this clearance is utilized as the restricted passage, so that the amount of this clearance determines the relative rapidity with which fluid can be exhausted from the lower end of bore 144 as the head 160 moves downward therein. This arrangement has the advantage of simplicity and also reduces the frictional resistance to movement of the valve piston 150 as no packing is used for the head 160. It will also be observed that the restricted passage between the bores 144 and 141 provided by this clearance space is generally similar in form and arrangement to the restricted passage or connection between the chamber 38 and the bore 141 provided by the clearance space between the shoulder 54 and throat 42 of the valve unit, so that both of these restricted connections will have generally similar if not identical characteristics.

The modified valve piston 150 is also provided with a longitudinal passage 164 which extends from the lower end of the head 160 into the reduced portion 155 of said valve piston intermediate the shoulder 54 and head 160. The passage 164 connects with a transverse passage 166 in the reduced portion 155 of the valve piston and the passage 164 is also provided with a check valve indicated broadly by the numeral 165 which is arranged to permit fluid to pass therethrough toward the outer end of the bore 144 but prevents the passing of fluid in the opposite direction. This arrangement is provided to permit fluid to freely enter the outer end of the bore 144 when the head 160 is therein whenever the pressure in the bore 141 exceeds the pressure in the bore 144, to thereby permit quick upward movement of the valve piston 160 so that said valve piston 160 may be quickly reset to its position of Fig. 3 from any lower position which it might occupy at the time the conduit 16 is connected with the return conduit 18 and also to permit said valve piston 160 to be moved quickly upward whenever the pressure in the chamber 38 and bore 141 exceeds the value required to effect such movement.

The functioning of this modified circuit guard valve unit 130 of Fig. 3 is generally similar to that of the unit 30 of Fig. 2 and will be understood from the explanation previously given.

The circuit guard valve units may be modified in other ways, such for example as shown in Fig. 4 in which the modified valve unit 230 is shown as connected with the portions 16—A and 16—B of the conduit 16 and the parts are shown in the positions which they occupy when said conduit 16 has been connected with the return conduit 18 and no fluid is flowing therethrough.

In this modified form the modified valve piston 250 is slidably supported by its stem 251 in the central opening of the modified gland 234, suitable packing being employed to prevent the outward leakage of fluid as indicated at 236 and 252 respectively. The modified gland 234 is held against inward displacement by a shoulder 235 and is also held against outward displacement by a plug or cap member 270, here shown as hollow to accommodate part of the spring 273 which urges the valve piston 250 the full distance toward its seat 233 in the modified housing 231. The cap or plug 270 is also shown as provided with a hole 272 in the top thereof through which a suitable hook or the like may be inserted into a hole 256 in the upper end of the preferably hollow stem 251 so that the valve piston 250 may be held off its seat 233 during filling or bleeding operations, etc.; the hole 272 also assures that the outer end of the valve stem 251 is at all times exposed to atmospheric pressure. In order to assure that the valve piston 250 is not raised off its seat 233 by hydraulic action when pressure exists in the chamber 238 and substantially no pressure exists in the bore 241 below the valve seat 233, the stem 251 is made of a diameter equal to or less than the diameter of the sealing contact between the head 253 of the valve piston 250 and the seat 233, and as here shown these relative proportions are assured by making the diameter of the stem 251 equal to the diameter of the throat 242 of the modified valve unit 230. With this arrangement, the valve piston 250 will be moved substantially instantly to bring the head 253 into sealing engagement with the seat 233 whenever, for any cause, the pressures in the chamber 238 and bore 241 drop below the value determined by the spring 273.

As in embodiments previously described, means are provided for maintaining during a substantially predetermined interval a restricted fluid connection between the chamber situated above the valve seat and the bore situated below said valve seat in order that a substantially predetermined maximum volume of fluid may pass into said bore before all fluid connection between said chamber and said bore is cut off, the interval above mentioned immediately following the increase of pressure in said chamber above the pressure existing in said bore after the pressure in both said chambers and said bore have dropped to a value below the value determined by the spring that urges the valve piston inward and while the pressure in said bore remains below the value required to move the valve piston upward. In the embodiment of Fig. 4 the means just mentioned are separate from the valve piston means and will now be described.

As shown in Fig. 4 the modified housing 231 is provided with a bore 244 closed on its lower end and having an enlarged upper end portion 245 which is suitably closed as by a plug 247. The chamber 238 is suitably connected with the enlarged upper end 245 of the bore 244 as by a transverse passage 239, here shown as an extension of the passage 39 in the boss 40. The bore 244 is also provided with a counterbore 246 which is suitably connected with the bore 241 as by a transverse passage 243, here shown as drilled from the side of the housing 231 adjacent the bore 244 and closed by a plug 248. Disposed within the bore 244 and extending into the enlarged upper end 245 thereof is a cylinder member 260 closed on its upper end except for passages to be presently described and held in position against a disk 249 at the lower end of the bore 244 as by a suitable spring 259 which acts against the upper end of said cylinder member 260 and the plug 247. As illustrated the cylinder member 260 has an outer diameter substantially the same as that of the bore 244 and suitable packing 261 is provided to form with the outer circumference of said cylinder member 260 a fluid tight seal between the enlarged upper end 245 of the bore 244 and the counterbore 246 therein.

Slidably fitted within the bore of the cylinder member 260 is a piston 280, here shown as hollow to receive a spring 289 which urges said piston 280 toward its extreme upper position in which it is shown in Fig. 4 and substantially instantly moves said piston 280 into this position whenever fluid pressures acting on the opposite ends thereof are substantially equal. The lower end of the spring 289 acts against a suitable abutment piece 287 in the bore of the cylinder member 260 and which is here shown as held in position by a retaining ring 288; the abutment piece and retaining ring also act as a stop which limits the downward movement of the piston 280. Fluid may be quickly and readily exhausted from the upper end of the bore of the cylinder member 260 upon upward movement of the piston 280 therein through the longitudinal passage 264 which is provided with a check valve 265 arranged to permit fluid to pass in this direction but preventing the passing of fluid in the opposite direction.

Other features of construction and arrangement of the cylinder member 260 and piston 280 will be understood from an explanation of the manner in which they function. For purposes of explanation, it will be assumed that the pressure in the bore 241 is less than the pressure required to move the valve piston 250 off its seat and also that the pressure in the chamber 238 has just increased above that in said bore 241. The conditions just mentioned would come about, for example, almost immediately following the establishment of fluid connection between the conduit 16 and the inlet conduit 15 or following a rupture in the system intermediate the valve seat 233 and the piston 10 of the motor B during the time that the conduit 16 is connected with the inlet conduit 15 and after the pressure in said chamber and in said bore had first dropped to a value such that the spring 273 had moved the valve piston 250 into the position in which it is shown in Fig. 4.

Referring to Fig. 4, under the conditions just mentioned pressure fluid from the chamber 238 would pass through the passage 239 into the enlarged upper end 245 of the bore 244 and thence through passages 262 formed in the cylinder member 260 into an annular port or counterbore 266 in the bore of said cylinder member 260. With the parts in the positions of Fig. 4, a restricted fluid connection is provided between the port 266 and an annular port region or port 267 of the bore of the cylinder member 260 which is connected with the counterbore 246 of the bore 244 as by means of radial passages 269 also formed in the cylinder member 260. The restricted fluid connection just mentioned is here provided by the space between the bore of the cylinder member 260 and the reduced portion or neck 282 of the piston 280 intermediate the head 281 at the upper end thereof and the head 283 at the lower end thereof, and this restricted passage is such that the resistance to flow therethrough builds up a pressure in the enlarged upper end 245 of the bore 244 exceeding the pressure in the counterbore 246. Fluid may thus pass from the chamber 238 to the bore 241 as long as this restricted connection remains open.

A counterbore 263 at the upper end of the bore of the cylinder member 260 is connected with the enlarged upper end 245 of the bore 244 by a restricted passage 268. Pressure fluid from the chamber 238 may thus enter the counterbore 263 where it acts upon the upper end of the piston 280 and moves said piston downward against the preferably relatively light resistance of the spring 289. Fluid exhausted from the bore of the cylinder member 260 in advance of the piston 280 as said piston moves downward may pass out through holes 284 formed in said piston 280 substantially as shown. The piston 280 will thus be moved downward but only at a rate determined by the rapidity with which pressure fluid enters the counterbore 263 through the restricted passage 268. The piston 280 will thus move downward relatively slowly until the longitudinal slots 286 formed in the upper end of its head 281 come into connection with the port 266, when pressure fluid will be admitted rapidly to the upper end of the piston 280 and rapidly moves said piston downward for the remainder of the distance to its extreme downward position in which the head 281 enters the portion of the bore of the cylinder member 260 intermediate the ports 266 and 267 therein, said head thus cutting off fluid connection between said ports. The purpose of the longitudinal slots 286 is to provide relatively quick movement of the piston 280 as it comes into its extreme downward position to thereby assure that the fluid connection between the ports 266 and 267 is completely cut off, and that a small fluid connection does not remain therebetween, but said slots 286 may be omitted in instances where such rapid final movement of the piston is found to be not required to assure complete cut off of the fluid connection between these ports.

A controlled interval is thus provided between the time that the piston 280 starts and completes its downward movement, the greater portion of which is retarded movement. During this interval the restricted connection above described is maintained between the ports 266 and 267 of the cylinder member 260 so that fluid may continue to pass from the chamber 238 into the bore 241 during this interval. As explained, this interval, which will vary with pressure and viscosity of the fluid, is controlled by means of the restricted passage 268 and similarly the volume of fluid passing from the chamber 238 to the bore 241 is controlled by the restricted passage between the ports 266 and 267 of the cylinder member 260, hence the maximum volume of fluid permitted to pass from said chamber to said bore is held to a substantially predetermined amount for each downward stroke of the piston 280. The modified circuit guard valve 230 of Fig. 4 thus limits to a substantially predetermined amount, which is preferably relatively small in comparison with the total fluid supply available, the maximum volume of fluid that may be unintentionally lost in the event of rupture of the circuit intermediate the valve seat 233 in the housing 231 and the piston 10 of the motor B, regardless of whether such rupture occurs prior to connection of the conduit 16 with the inlet conduit 15 or at any time while such connection exists.

The valve piston 250 will be almost immediately moved upward from its position of Fig. 4, to thereby establish direct and substantially unrestricted fluid connection between the chamber 238 and the bore 241, whenever the pressure of the fluid in the bore 241 reaches a value such that the action thereof on the lower end of the valve piston 250 is sufficient to overcome the forces acting to hold said valve piston's head 253 in engagement with the valve seat 233. This will occur almost instantly after the establishment of fluid connection between the conduit 16 and the inlet conduit 15 if the system has not been ruptured and is filled with fluid. It will also occur substantially immediately after the passing (through the restricted connection between the ports 266 and 267 of the cylinder member 260) of sufficient fluid to replenish any normal amount of leakage that may have taken place in the circuit intermediate the valve seat 233 and the piston 10 of the motor B, as will be understood from the explanation given in connection with the embodiment of Fig. 2. Whenever such upward movement of the valve piston 250 occurs, the pressures acting on the opposite ends of the piston 280 will be substantially equalized and said piston 280 will be restored to its position of Fig. 4. As will also be understood from the explanation previously given, in the event that the motor B fails to respond after establishment of connection between the inlet conduit 15 and the conduit 16, the pilot or operator may cause the piston 280 to repeat its downward stroke as often as desired, thereby permitting a substantially predetermined volume of fluid to pass from the chamber 238 into the bore 241 for each such downward stroke of said piston 280, by first connecting the conduit 16 with the conduit 18 to permit the piston 280 to be reset to its position of Fig. 4 and subsequently re-establishing connection between said conduits 15 and 16.

Up to this point the circuit guard valve units have been considered as disposed in the circuit intermediate the selector valve A and the motor B as illustrated in Fig. 1. This will frequently be the most convenient location in the circuit for these units but they may also be located at other positions in the circuit or system. For example, the circuit guard valve units may be disposed in the inlet conduit in advance of the selector valve as illustrated in Fig. 5 in which the circuit guard valve unit 30, identical with the unit 30 of Figs. 1 and 2, is shown as connected with a portion 15—A of the inlet conduit 15, the other end of said portion 15—A being connected with the source of pressure fluid, not shown, and said circuit guard valve unit 30 also being connected with the portion 15—B of the inlet conduit 15 which leads to and connects with the inlet port 25 of the selector valve A. In this arrangement the one circuit guard valve unit 30 protects against the loss of fluid, except for the preferably small and substantially predetermined volume previously described and explained, in the event of rupture at any point in the circuit beyond the valve seat 33 of the unit 30. It is thus unnecessary to place circuit guard valves in the cylinder conduits 16 and 17 when the arrangement of Fig. 5 is employed and said conduits may be directly connected to the fluid motor to be actuated, such, for example, as the motor B of Fig. 1. This arrangement may, therefore, be preferred in some instances such, for example, as instances in which only one selector valve is employed in the circuit or where a plurality of selector valves are employed with each selector valve having an inlet conduit in which the circuit guard valve unit may be positioned.

Either the modified circuit guard valve unit of Fig. 3 or that of Fig. 4 may be substituted for the circuit guard valve unit 30 in the arrangement of Fig. 5. With all of these units, however, it will be necessary for the pilot or operator to pull the valve piston upward from its seat in the event the said valve piston is forced into engagement with its seat and all fluid connection between the portions 15—A and 15—B of the inlet conduit 15 is cut off. For example, in the arrangement of Fig. 5 if rupture of the conduit 16 occurs while the inlet conduit 15 is connected therewith, the circuit guard valve 30 would close and completely cut off communication between the portions 15—A and 15—B of the inlet conduit 15, after permitting a substantially predetermined volume of fluid to pass into the portion 15—B as previously explained. While such rupture would make it impossible to operate the fluid motor by pressure fluid supplied thereto through the conduit 16, it would be possible and might be desirable to still operate the motor in the opposite direction by means of pressure fluid admitted thereto through the conduit 17. In order to effect such operation of the motor, however, the pilot or operator must first turn the valve body 24 of the selector valve A to connect the port 25 thereof with the cylinder port 27 and must then pull the valve piston out of engagement with its seat, by the means provided for this purpose, as well as for use in filling and bleeding the circuit, in each of the embodiments described. I therefore prefer to use a further modified form of the improved circuit guard valve according to the present invention when conditions permit its use and when the circuit guard valve is disposed in the inlet conduit in advance of the selector valve. In this further modified form, means are provided by which the valve piston is moved out of engagement with its seat, if it should be in such engagement, each time that the connection is established between the conduit 15 and the conduit 16 or between the conduit 15 and the conduit 17. By way of example, in Fig. 6 I have illustrated a portion of the modified fluid system together with such a modified form of the circuit guard valve unit, broadly designated by the reference numeral 330 which will now be described.

Referring now to Fig. 6, I have shown, partly in section, a modified circuit guard valve unit 330 similar in many respects to the unit 130 of Fig. 3 but differing therefrom in certain particulars which will be pointed out presently. In the particular arrangement illustrated the passage 39 of the valve unit 330 is connected with the portion 15—A of the inlet conduit 15 which leads from the source of pressure fluid, not shown, and the passage 45 of said valve unit 330 is connected with the portion 15—B of said inlet conduit 15 which leads to and connects with the inlet port 25 of the modified selector valve AA, identical with the selector valve A of Fig. 1 except with respect to particulars also to be presently pointed out.

The stem 151, head 53, shoulder 54 and head 160 of the modified valve piston 350 are identical with the similarly designated portions of the valve piston 150 of Fig. 3 already described but in this instance the reduced neck portion 355 of the modified valve piston 350 intermediate the shoulder 54 and the head 160 does not contain the passages and check valve which are positioned in the reduced portion 155 of the valve piston 150 of Fig. 3. In the modified arrangement of Fig. 6, a schematically illustrated passage 364 connects the outer end of the modified bore 344 of the modified housing 331 with the bore 141 thereof and is provided with a check valve 365 which permits fluid to pass out into the outer end of said bore 344 but prevents the passing of fluid in the opposite direction. The passage 364 and the check valve 365 correspond to and perform the same functions as the passages 164 and 166 and the check valve 165 respectively of Fig. 3. A diagrammatically illustrated restricted passage 368 connects the bore 141 with the passage 364 at a point intermediate the check valve 365 and the bore 344 and this restricted passage 368 schematically illustrates the restricted passage or fluid connection between the bores 344 and 141 which provides the dash pot action that effects the retarded movement of the valve piston 350 as said valve piston moves downward from the position in which it is shown in Fig. 6, as will be understood from explanations previously given. It will be understood, however, that this restricted passage or fluid connection may, if desired, comprise a clearance between the outer diameter of the head 160 and the bore 344, as in the arrangement of Fig. 3, or any other suitable form.

A rod-like portion 359 extends downward from the head 160 in the modified valve piston 350 of Fig. 6 and projects through a suitable opening in the closed end of the bore 344, suitable packing 361 being employed to prevent the outward leakage of fluid from said bore 344. The modified selector valve AA of Fig. 6 is provided with a shaft 320 integral with the rotatable valve body 324 thereof or suitably attached to said valve body 324 for simultaneous rotating movement therewith and a cam member 325 positioned on the exterior of the selector valve AA is mounted on said shaft 320 and connected therewith for simultaneous rotating movement as by the key 321. The cam member 330 is provided with four lobes 326 separated by four portions of reduced diameter 327, all surfaces being preferably suitably curved to provide cam action in conjunction with the outer end of the rod portion 359 of the modified valve piston 350. The arrangement is such that one of the lobes 326 comes into engagement with the end of the rod portion 359 of the valve piston 350 as the valve body 324 is turned to change connection of the inlet conduit 15 with the cylinder conduits 16 or 17, as the case may be, if the valve piston 350 occupies a position lower than that in which it is shown in Fig. 6, said valve piston being biased toward its position of Fig. 6 by spring means, not shown in Fig. 6, identical in construction and arrangement with the spring 73 and cooperating parts of Fig. 3. With this arrangement, whenever the rotatable valve body 324 is turned to change the connection of the conduit 15 from the conduit 16 to the conduit 17, or vice versa, the cam 325 restores the valve piston 350 to the position of Fig. 6 if it should occupy a lower position due, for example, to rupture of the conduit with which said inlet conduit 15 had been previously connected or any other cause. In all other respects the modified circuit guard valve unit 330 of Fig. 6 functions in the same manner as the unit 130 of Fig. 3 and the arrangement of Fig. 6 is such that one of the portions of reduced diameter 327 of the cam member 325 is in line with the end of the rod portion 359 of the valve piston 350 whenever the conduit 15 is connected with either the conduit 16 or the conduit 17 in order that said valve piston may move to its extreme downward position in the event of rupture of the conduit with which it is connected, the proportions being such that the said portions 327 do not interfere with such downward movement of said valve piston 350.

While particularly suited for use in the inlet conduit in a position in advance of the selector valve, it will be understood that the modified circuit guard valve unit 330 of Fig. 6 may also be positioned at other points in the circuit, such, for example, as in the conduits 16 and 17. For convenience in illustration, the conduit 17 has not been shown in Fig. 6 but it will be understood that said conduit 17 corresponds to and occupies the same relative position as the conduit 17 of Fig. 1 or Fig. 5.

The circuit guard valve means according to the present invention may be also modified so that said valve will be kept open for the substantially unrestricted flow of fluid therethrough, in either direction of fluid flow, whenever the requisite pressure exists in either of two fluid pressure lines, such, for example, as in either the outgoing conduit or the return conduit. By way of example, modified circuit guard means of this general character are illustrated in Figs. 7 and 8 in which Fig. 7 shows an enlarged view, partly in section of a modified circuit guard valve unit 430 and Fig. 8 shows a modified fluid system or circuit including modified circuit valve means or units according to Fig. 7 in the conduits 16 and 17 respectively, together with the fluid connections therefor.

Referring to Fig. 7, the modified valve unit 430 is similar to the valve unit 30 of Fig. 2 from which it differs only in certain particulars which will now be pointed out. As clearly shown in Fig. 7, a rod portion 455 extends downward from the shoulder 54 of the modified valve piston 450, this valve piston 450 being identical with the valve piston 50 of Fig. 2 in all other respects. The rod portion 455 of the valve piston 450 extends through a suitable opening in a partition 440 that separates the counterbore 441 from a chamber 442 formed in the modified housing member 431, suitable packing 451 being used to prevent leakage of fluid around said rod portion 455 in either direction. The counterbore 441 just mentioned corresponds with the bore 41 of Fig. 2 but in this instance has been shown as of larger diameter than that of the throat 42 of the modified housing 431, although not necessarily so. The rod portion 455 is made of a diameter less than that of the stem 51 of the modified valve piston 450 in order that said valve piston may be moved upward toward and into its extreme upper or fully open position whenever the requisite pressure exists in the chamber 38 and the counterbore 441, such pressure fluid acting on the lower end of the shoulder 54.

The lower end of the rod portion 455 of the valve piston 450 is arranged to be in contact with the upper end of the dash-pot piston 60 when the valve piston 450 and the dash-pot piston 60 occupy the positions in which they are shown in Fig. 7. The dash-pot piston 60 is slidable in the bore 444 formed in the modified housing 431 and said dash-pot piston is urged toward its extreme upper position in which it is shown in Fig. 7 by a spring 63, the shoulder 443 at the inner end of the bore 444 preventing further upward movement of said dash-pot piston. The outer end of the bore 444 is closed by a cap member 47, shown as identical with the similarly designated member of the embodiment of Fig. 2 together with the packing 48 therefor. The dash-pot piston 60 of Fig. 7 is identical in construction and functioning with the similarly designated dash-pot piston of Fig. 2.

The chamber 442 is adapted to be connected with whichever of the conduits is the return conduit at the time that the conduit connected with the bosses 40 and 46 is the outgoing conduit. In the arrangement of Fig. 7 the bosses 40 and 45 are connected with the portions 16—A and 16—B respectively of the conduit 16 and hence the chamber 442 is connected with the conduit 17, as by a passage 446 in a boss 447 which is connected with a passage 416 leading to and connecting with the conduit 17 as illustrated in Fig. 8. The point of connection between the conduit 17 and the passage 416 is here shown as intermediate the motor B and the circuit guard valve unit 430 (Fig. 8), although not necessarily so. With this this arrangement, pressure existing in the conduit 17 is transmitted to the chamber 442 where it acts on the lower end of the rod portion 455 of the valve piston 450, urging said valve piston 450 upward and moving it to or holding it in its extreme upper position whenever the pressure in said chamber equals or exceeds the value necessary for this purpose.

The valve piston 450 of the valve unit 430 may thus be moved to or held in its extreme upper position by action of pressure fluid in either the conduit 16 or 17. This is also true with respect to the circuit guard valve unit 430' of Fig. 8, here presumed to be identical with the unit 430, which is shown as positioned in the conduit 17 and having its boss 447 connected with the conduit 16 as by the passage 417. The arrangement may thus be made such that both of these valve units will be kept open whenever there is flow of fluid through the conduits 16 and 17, and this may frequently be desirable. For example, the arrangement may be made such that back pressure in the conduit 17 caused by exhaust of fluid from the motor B through the conduit 17 would keep the valve unit 430 open even during overrun of the piston 10 of the motor B, notwithstanding that the pressure in the conduit 16 might drop to a low value during such overrun. Also, pressure in the conduit 16 would keep the valve unit 430' open during exhaust of fluid through the conduit 17, thus assuring minimum resistance to flow through said unit 430' in this direction of fluid flow.

In all other respects the circuit guard valve unit 430 of Fig. 7 functions in substantially the same manner as the valve unit 30 of Fig. 2 as already explained and will close to limit the loss of fluid from the system in the event of a rupture therein. With the arrangement made such as described in the preceding paragraph, if the rupture occurs in the outgoing conduit, that is to say, the conduit conveying pressure fluid to the motor B, during overrun of the piston 10 of the motor B, the amount of fluid escaping will equal the volume passing through the outgoing conduit while the corresponding circuit guard valve 430 or 430' therein is held open by back pressure in the other of said conduits, that is to say, by back pressure in the return conduit, caused by exhaust of fluid from the motor during such overrun, plus the volume permitted to pass through the circuit guard valve unit in the outgoing conduit during the retarded downward movement of the valve piston 450 until its fully closed position is reached.

The circuit guard valve means according to the present invention may be further modified to provide such means capable of safeguarding against excessive loss of fluid due to rupture in any one of a plurality of conduits. By way of example, a modified arrangement of this general character is illustrated in Fig. 9 in which the circuit guard valve means is shown as arranged to safeguard against excessive loss of fluid from the system in the event of rupture of either of two fluid conduits.

Referring to Fig. 9 the modified circuit guard valve means broadly designated by the numeral 530 has been shown as connected with the portions 16—A and 16—B respectively of the conduit 16 and with the portions 17—A and 17—B of the conduit 17 which may be similar to the correspondingly designated conduits of Figs. 1 and 8, except, of course, that other circuit guard valve units or means would be omitted when the arrangement of Fig. 9 is employed. Certain of the parts of members of the modified circuit guard valve means of Fig. 9 are identical with corresponding parts or members of the circuit guard valve means 30 of Fig. 2 and accordingly have been designated by the same reference numerals.

The valve means 530 of Fig. 9 is contained within a two-part housing here shown as comprising a housing member 31 identical with the similarly designated housing of Fig. 2 and also a housing member 531. The housing member 31 is provided with a dash-pot piston 60 slidable within the bore 44 of said housing member 31 and identical in construction with the dash-pot piston 60 of Fig. 2, and likewise functioning in the same manner. A spring 63 urges the dash-pot piston 60 of Fig. 9 into its extreme inward position in which it is shown, in the same manner as explained in connection with Fig. 2. The outer end of the bore 44 is closed by a cap member 47 together with packing 48 which are also identical with the similarly designated members of the embodiment of Fig. 2.

In the modified housing 531 the bore 541, which corresponds to the bore 41 of the housing 31, terminates in a partition 540 which separates said bore 541 from a central opening 542 in the modified end portion 544 extending into and closing the bore 32 of said housing 31 of Fig. 9 substantially as illustrated, the two housing members being held together by threaded engagement with one another as shown. The portions of the housing member 531 just mentioned take the place of the bore 44 of the housing member 31, as clearly shown in Fig. 9 but in all other respects the housing member 531 is identical with said housing member 31. Suitable packing 543 is provided to prevent leakage around the outer circumference of the housing members and portion 544.

The circuit guard valve means of Fig. 9 includes valve piston means here shown as a two-part piston structure comprising a valve piston member broadly designated by the numeral 550 and a valve piston member broadly designated by the numeral 580. The valve piston member 550 includes a head 53, a shoulder 54 and a reduced end portion 55 identical with the similarly designated portions of the valve piston 50 of Fig. 2 and, similarly, the arrangement is such that the tip of said reduced end portion 55 is in contact with the adjacent end of the dash-pot piston 60 when the parts occupy their positions of Fig. 9. The valve piston member 550 is slidably supported by its stem 551 which extends from the head 53 and enters the central opening 542 in the end portion 544 of the housing member 531, suitable packing 532 being employed to prevent leakage around said stem 551. The end of the stem 551 terminates in a reduced portion 556 having a diameter less than that of the stem 551 and extending through a suitable opening in the partition 540 into the bore 541 of the housing member 531, suitable packing 543 being employed to prevent leakage around said reduced portion 556. The end of the stem 551 is adapted to be exposed to atmospheric pressure and the space in the central opening 542 intermediate the end of said stem 541 and the partition 540 is accordingly connected with the atmosphere as by a passage 547.

The valve piston member 580 includes a stem 581 having a diameter greater than the diameter of the reduced portion 556 of the valve piston member 550 but less than the diameter of the shoulder 584, and as here shown the diameter of the stem 581 is the same as the diameter of the stem 551, but not necessarily so. The valve piston 580 also includes a head 583 and the shoulder 584 above mentioned which correspond with and are here shown as substantially identical with the head 53 and shoulder 54 respectively of the valve piston member 550. The valve piston member 580 is slidably supported by its stem 581 in the central opening of a gland 34, identical with the gland 34 of the embodiment of Fig. 2, said gland 34 of Fig. 9 being held against inward displacement by a shoulder 35 and also being held against outward displacement by a hollow cap member 570 in threaded engagement with the outer end of the bore of the modified housing member 531. Suitable packing is provided to prevent leakage around the gland 34 and stem 551, here illustrated by the packing 36 and 52 respectively.

The valve piston members 550 and 580 are arranged to be connected for simultaneous axial movement. The valve piston member 550 accordingly also includes a rod portion 557 of smaller diameter than and extending from the reduced portion 556 of said valve piston member 550, said rod portion extending entirely through the valve piston member 580 which is provided with a suitable central opening for this purpose, packing 558 being employed to prevent leakage around said rod portion 557. Similarly, the end of the valve piston member 580 adjacent the shoulder 584 thereof terminates in a preferably tapered portion 585 adapted to be in contact with a washer 560 which in turn bears against the preferably spherical surface 555 formed on the end of the reduced portion 556 of the valve piston member 550. The two valve piston members are held together for simultaneous axial movement by means of a nut 586 and a jam or lock nut 587 on the threaded end of the rod portion 557 of the valve piston 550, the nut 586 bearing against a washer 588, which in turn bears against the preferably spherically shaped end of the valve stem 581, the arrangement thus being such as to permit limited universal and radial adjusting movement of the valve piston member 580 relative to the valve piston member 550 so as to prevent binding of the parts and permit both of the heads 53 and 583 to engage their respective valve seats 33 in fluid tight engagement when the valve piston means occupies its fully closed position. It is for the same reason that the above described washer and spherical surface arrangement is preferably provided at the end of the reduced portion 556 of the valve piston member 550. With this arrangement the two valve piston members 550 and 580 will move axially in unison with one another and the arrangement is further made such that the heads 53 and 583 of these valve piston members come into fluid tight engagement with their respective valve seats 33 simultaneously and also such that the shoulders 54 and 584 occupy the same relative positions with respect to the respective throats 42 of the valve means.

The valve piston means of Fig. 9 is biased toward the position in which it is shown by the springs 63 and 73 in substantially the same manner as explained in connection with the valve piston 50 of Fig. 2. The spring 63, acting through the dash-pot piston 60 of Fig. 9, serves to urge the valve piston means toward its position of Fig. 9 if displaced therefrom in a direction toward the cap member 47. Similarly, the spring 73 disposed in the interior of the cap member 570 urges the valve piston means toward its position of Fig. 9 if displaced therefrom in a direction away from the cap member 47; for this purpose, the outer end of the cap member 570 is provided with an internal flange 571 against which the outer end of said spring 73 bears. The inner end of the spring 73 bears against a modified abutment piece or spring retaining cup 574 having an internal flange 575 arranged to engage the jam nut 587 when the valve piston means of Fig. 9 is displaced from its position thereof in a direction away from the cap member 47; the gland 34 acts as a stop preventing further inward movement of the retaining cup member 574 and hence limits the extent to which said spring 73 can urge or move the valve piston means in a direction toward the cap member 47.

With this modified arrangement as shown in Fig. 9 and with the parts in the positions shown therein, the valve piston means will be moved away from the cap 47 and toward its fully open position by the requisite pressure in either the bore 41 or the bore 541 and will be held in its fully open position whenever the requisite pressure exists in either the conduit 16 or the conduit 17; in this respect the arrangement of Fig. 9 functions in a manner generally similar to that of Fig. 7. The valve piston means will be moved to bring its heads 53 and 583 into engagement with their respective seats 33 upon rupture of whichever of the conduits is the outgoing conduit and upon the drop in the pressures in both conduits below the pressure required to hold said valve piston means toward its fully open position and away from the position in which it is shown in Fig. 9. Upon such rupture and pressure drop, the piston valve means will move from its position of Fig. 9 to its fully closed position at a relatively retarded rate of movement determined by dash-pot action of the dash-pot piston 60 in the same general manner as explained in connection with the embodiment of Fig. 2 so that under most conditions of operation the volume of fluid permitted to escape from the outgoing line is thus limited to the substantially predetermined volume permitted to pass through said line and the circuit guard valve means during this interval. As in the embodiment of Fig. 7, however, in case of overrun of the piston 10 of the motor B, the fluid exhausted by said motor during such overrun may hold the heads 53 and 583 valve piston means out of engagement with their respective valve seats 33 if the return conduit is not ruptured; in the event of rupture of the outgoing conduit during or prior to such overrun of the motor B, the maximum fluid loss from the outgoing conduit would then comprise the volume of outgoing fluid permitted to pass through the circuit guard valve means 530 during overrun and the volume thereof permitted to pass through said circuit guard means 530 during the interval of relatively retarded movement of the valve piston means from its position of Fig. 9 to its fully closed position.

To facilitate filling and bleeding of the circuit or the like, the mechanic may hold the valve piston means of Fig. 9 in its fully open position by grasping with pliers or the like the reduced end portion 559 of the rod portion 557 of the valve piston member 550, the pliers or other tool being inserted through the hole 572 in the cap member 570 after removing the cover 573

In the several embodiments illustrated herein the restricted fluid connection, provided under the conditions mentioned, between the chamber above the valve seat and the bore below said seat, as well as others of the restricted passages, have been shown in somewhat exaggerated manner for purposes of illustration only and such passages may be made of any suitable size or type, as already mentioned. For example, referring to Fig. 2, it may be desirable to make the relative diameters of the throat 42 and of the shoulder 54 such that substantially the full working pressure of the system exists in the chamber 38 when the valve piston 50 occupies its position of Fig. 2 or a lower position. Under this condition, the valve piston 50 will continue its controlled downward movement from its position of Fig. 2 to its fully closed position unless a relatively high pressure is built up in the bore 41, thus assuring that the valve unit will not open to permit the substantially unrestricted flow of fluid therethrough unless the portion of the circuit directly connected with the bore 41 is sufficiently free from ruptures or leaks to sustain this relatively high pressure, which, for example, may be made the pressure required to actuate the motor B. It will also be understood, from the explanation previously given, that the value of the pressure in the bore 41, required to move the valve piston upward from its position of Fig. 2, is also in part determined by the relative diameters of the stem 51 and of the shoulder 54.

The restricted connection between the chamber 38 and the chamber or bore 41 of Fig. 2, provided when the valve piston 50 is in its position of Fig. 2 and as said valve piston 50 moves toward its seat 33, may also be modified in other ways. For example, either the throat or the shoulder may be tapered, as will be understood, for example, from the view of Fig. 10 in which the modified shoulder 654 is shown as tapered toward its lower end. With this modified arrangement of Fig. 10, the restricted connection between the chamber 38 and the bore 41 is progressively reduced as the modified valve piston 650 moves downward from the position in which it is shown, thus causing progressive increase of the pressure in the chamber 38 corresponding increase in the force acting to move the valve piston 650 downward. Among other advantages, this modified arrangement provides an increasing downward force acting on the valve piston 650 which may offset or compensate for the increasing resistance of the spring 63 (not shown in Fig. 10) of the dashpot piston 60 as said spring is compressed. Referring again to Fig. 2, however, it will be observed that with the particular arrangement illustrated therein, the axial length of the restriction or restricted connection between the chamber 38 and bore 41, as provided by the clearance space between the shoulder 54 and the throat 42, increases as the valve piston 50 moves downward from its position of Fig. 2. This progressive increase in axial length of the restricted connection just mentioned may tend to progressively increase the resistance to the passing of fluid therethrough, with consequent increase in the pressure in the chamber 38, notwithstanding that neither the shoulder 54 nor throat 42 are tapered.

The fragmentary view of Fig. 11 illustrates a further modified arrangement of the restricted connection between the chamber above the valve seat and the bore below said seat and is here shown, for purposes of illustration, in connection with a modified form of the circuit guard valve means of Fig. 2. In this instance the modified valve piston 750 is provided with a relatively thin or narrow head 754 having a diameter greater than that of the stem 51 and less than that of the modified throat 742, the relative diameters of said head 754 and said throat 742 being such as to provide the desired restricted connection between the chamber 38 and the chamber or bore 741 as said valve piston 750 moves downward from its position of Fig. 11. The head 754 of Fig. 11 thus serves substantially the same purpose as the shoulder 54 of Fig. 2. A reduced portion 752 separates the head 754 from the head 53 of the modified valve piston 750 and similarly an end portion 755 projects downward from the head 754 and the arrangement is such that the tip of said end portion 755 is in contact with the upper end of the dashpot piston 60 when the parts are in their positions of Fig. 11 or lower positions. The throat 742 is here shown as of substantially uniform diameter, although not necessarily so, and of such length that the head 754 remains in said throat 742 throughout the downward movement of the valve piston 750 from its position of Fig. 11 to its fully closed position. With this modified arrangement, the resistance to the passing of fluid through the restricted connection, provided by the clearance space between the head 754 and the throat 742, remains substantially constant throughout the downward movement of the valve piston 750 from its position of Fig. 11. In some instances this construction may also result in a small reduction in the weight of the unit. As here shown the throat 742 and bore 741 are of the same diameter but this is not necessarily the case, as will be understood from previous explanations.

The circuit guard valve means according to the present invention may also be modified in still other ways, such, for example, as shown in Fig. 12 which illustrates modified circuit guard valve means broadly designated by the numeral 830 and including a modified housing 831, here shown as having bosses 40 and 46 with which are respectively connected the portions 16—A and 16—B of the conduit 16 of Fig. 1. The modified circuit guard valve means 830 also includes a modified valve piston 850 having a head or body portion 852 slidably fitted within the bore 832 of the housing 831 and provided with suitable packing 857 to prevent the leakage of fluid around said body portion 852. The lower end of the body portion 852 is provided with a beveled face 853 which is arranged to engage the valve seat 833 in fluid tight relation therewith when the valve piston 850 is in its extreme downward or fully closed position. A shoulder 854 projects downward from the body portion 852 and the arrangement is such that this shoulder enters the throat 842 of the unit when the valve piston 850 occupies its position of Fig. 12, the clearance space between the shoulder 854 and the throat 842 providing a restricted fluid connection between the chamber 838 and the bore 841 when said valve piston 850 occupies the position in which it is shown in Fig. 12. The diameter of the shoulder 854 is thus made slightly less than that of the throat 842 but greater than the diameter of the stem 851 of the valve piston 850. The stem 851 just mentioned extends upward from a stop or shoulder 856 at the upper end of the body portion 852 and as here shown the stem 851 is identical with the stem 151 of Fig. 3 and likewise projects through a gland 34 identical with the similarly numbered gland of Figs. 2 and 3, suitable packing being used to prevent leakage past said gland and past said stem as indicated at 36 and 52.

The gland 34 of Fig. 12 is held against outward displacement by a cap member 170 identical with the cap member 170 of Fig. 3, within which are a spring 73, retaining cup member 174, abutment piece 172, rod 180 and associated parts, all identical with the similarly designated members of the embodiment of Fig. 3 and functioning in the same manner. The arrangement of Fig. 12 is thus such that the valve piston 850 is biased into the position in which it is shown in this figure whenever the pressures in the chamber 838 and the bore 841 are substantially equalized and are below a predetermined value, as will be understood from explanations previously given.

Downward movement of the valve piston 850 from its position of Fig. 12 is controlled by regulation or control of admission of fluid to the chamber 839 situated intermediate the upper end of the body portion 852 and the gland 34. In the particular embodiment illustrated in Fig. 12 the arrangement is such that the valve piston 850 remains substantially stationary during a substantially predetermined interval before commencing its downward movement from its position of Fig. 12 toward the seat 833 and then moves quickly to its fully closed position, this being accomplished by control of admission of fluid to the chamber 839 by means of valve mechanism which will be understood from an explanation of the manner in which it functions. For purposes of this explanation it will be assumed that the valve piston 850 occupies its position of Fig. 12 and that the portion 16—A of the conduit 16 has just been connected with the source of pressure fluid, as by connection with the conduit 15 of Fig. 1.

Under the conditions just mentioned, fluid will pass into the chamber 838 and thence, through the restricted connection provided by the clearance space between the shoulder 854 and the throat 842, into the chamber or bore 841. If the portion of the circuit or system directly connected with the bore 841 is intact (i. e. free from rupture, etc.) and filled with fluid, pressure will be built up in the chamber 841 almost instantly and this pressure, acting on the lower end of the valve piston 850, will almost instantly move said valve piston 850 upward toward its fully open position to permit the substantially unrestricted passing of fluid through the circuit guard valve means or unit 830. Upon such upward movement of the valve piston 850 fluid passes out of the chamber 839 into the chamber 838, the path of flow including a portion of the passage 870, the passage 871 and the passage 872, the check valve 873 in said passage 871 opening to permit the flow of fluid in this direction but preventing the passing of fluid therethrough in the opposite direction. It will be understood that upward movement of the valve piston 850 will take place whenever the pressure in the chamber 841 reaches the required value.

Under the conditions assumed for purposes of explanation, fluid will also pass from the chamber 838 into the adjacent end of the bore 861 of the cylinder member 860, this path of flow including the passage 872, a portion of the passage 871, portions of the passage 875, the passage 877 and a suitable opening in the end cover 862 which closes this end of the bore 861. In this direction of flow, the check valve 876 in the passage 875 prevents the passing of fluid therethrough so that the fluid entering the end of the bore 861 adjacent the cover member 862 is limited to the volume which may pass through the restricted connection or passage in the passage 877, this restricted connection being here schematically illustrated as a variable orifice 878 which may be varied to provide any desired extent of opening, as by the schematically illustrated varying means 879. Pressure fluid entering the bore 861 through the path of flow just described acts upon the adjacent end of a valve piston or plunger 868 which is slidably fitted within the bore 862 and is here shown as hollow to receive one end of a spring 867 whose other end is received in a suitable reduced bore 864 of the cylinder member 860. The spring 867 is preferably light but of sufficient strength to quickly return the plunger 868 to its position of Fig. 12 when the pressures on the opposite ends of said plunger are substantially equalized. The plunger 868 will be moved toward the right as viewed in Fig. 12 by pressure fluid thus admitted to the bore 861 and its rate of movement will depend upon the rapidity with which pressure fluid may pass through the orifice 878 which (in applications of the general character previously mentioned) is preferably made such or so adjusted that the fluid passing therethrough produces relatively slow movement of the plunger 868 toward the right. Fluid in advance of the plunger 868 as it moves toward the right is exhausted through a suitable opening in the end cover 863 which is appropriately connected with a passage 880 leading to and connecting with a passage 881, one end of said passage 881 connecting with the passage 870 and the other end thereof connecting with the passage 882 which in turn connects with the passage 45 in the modified housing 831. Fluid exhausted in advance of the plunger 868 will thus pass into the passage 45 as its pressure will be relatively low and insufficient to open the check valve 885 in the passage 870, said check valve being held closed by pressure on the side thereof directly connected with the chamber 839. It may here be noted that some pressure will exist in the chamber 839 under the conditions now being considered, this pressure being caused by action of the pressure fluid upon the beveled face 853 of the valve piston 850, but such pressure in said chamber 839 will be lower per square inch than that in said chamber 838 due to the fact that the net effective area of the beveled face 853 is less than the net effective area of the upper end of the body portion 852 in said chamber 839.

The bore 861 of the cylinder member 860 is provided with an annular counterbore or port 865 which is connected with the passage 871 by a passage 883 leading to and connecting with the passage 871 and said bore is also provided with an annular counterbore or port 866 which is connected with the passage 870 by the passage 884. It will be observed that the plunger 868 covers both of the ports 865 and 866 when said plunger is in its position of Fig. 12 and will continue to cover them until said plunger has been moved therefrom a considerable distance toward the right, the arrangement being such that no fluid may pass through said ports as long as they are covered by said plunger.

The plunger 868 will continue its relatively slow movement toward the right, at a rate determined by the rapidity with which fluid is admitted to the bore 861 through the orifice 878, during an interval until the left end of said plunger 868 uncovers the port 865. Immediately upon this uncovering of the port 865 pressure fluid will be admitted therethrough relatively rapidly into the bore 861, whereby the plunger 868 will be moved relatively rapidly through the remainder of its path of movement toward the right and into its extreme position at the right, in which position the left end of said plunger 868 is disposed to the right of the port 866, so that said port 866 is fully uncovered and is connected with the port 865. Fluid connection is thus established between the chamber 838 and the chamber 839.

During the interval of movement of the plunger 868 from its position of Fig. 12 until it uncovers the port 866, fluid will have continued to pass from the chamber 838 into the bore 841 through the restricted connection therebetween and will build up in said chamber 841 pressure sufficient to move the valve piston 850 upward from its position of Fig. 12 if the portion of the circuit directly connected with said chamber 841 is intact, normal leakage from this portion of the circuit being replenished during this interval. If, however, the fluid passing into the bore 841 during this interval does not build up therein the pressure required to move the valve piston 850 upward from its position of Fig. 12, as due, for example, to rupture of the portion 16—B of the conduit 16, the valve piston 850 will remain substantially stationary in its position of Fig. 12 during said interval. Under the condition just mentioned, the valve piston 850 will be moved downward to its fully closed position substantially instantly after the plunger 868 uncovers the port 866 and thereby establishes fluid connection between the chambers 838 and 839; the force then acting to move said valve piston 850 downward is equal in amount to that produced by the force exerted by the pressure fluid upon an area equal to the difference between the cross-sectional areas of the shoulder 854 and the stem 851 of said valve piston 850. The maximum volume of fluid thus permitted to pass through the restricted connection between the chamber 838 and the bore 841, unless the pressure required to move the valve piston 850 upward from its position of Fig. 12 is built up in the bore 841, is thus determined by the volume that may pass through said restricted connection during the interval of movement of the plunger 868 from its position of Fig. 12 until it uncovers the port 866 and hence said volume may be limited to a substantially predetermined and controlled amount by means of the orifice 878, which in the particular arrangement illustrated may be adjusted to any desired extent.

As in the embodiments previously described, this maximum volume will be held closely approximately, if not exactly, to the predetermined amount even though the viscosity of the circulated fluid may change and even though there may be a change in the pressure of the fluid in the chamber 838 during the interval above mentioned. In this instance, change in viscosity will correspondingly (although not necessarily exactly) change the relative resistance to flow through the restricted connection between the chamber 838 and the bore 841 and through the orifice 878 and, similarly, change in pressure of the fluid in the chamber 838 will correspondingly (although not necessarily exactly) change the relative rapidity with which fluid will pass through said restricted connection and said orifice. The duration of the interval in which the restricted connection is maintained between the chamber 838 and the bore 441 is thus modified conformably with the rapidity with which fluid passes through said restricted connection, this modification in the duration of said interval being effected by modification in the interval of movement of the plunger 868 from its position of Fig. 12 until it uncovers the port 866 which, in turn, is modified by modification of the rapidity with which fluid passes through the orifice 878.

The valve piston 850 will be substantially instantly reset to its position of Fig. 12, irrespective of whether it occupies a higher or a lower position, when the pressures in the chamber 838 and in the bore 841 drop below a value determined by the spring 73 as, for example, when the conduit 16 is connected with the exhaust conduit 18 of Fig. 1, as will be understood from explanation previously given. If the valve piston 850 is below its position of Fig. 12 at the time of such resetting, the consequent upward movement thereof will cause fluid to be exhausted from the chamber 839 into the chamber 838, said fluid passing through the passages 870, 871 and 872 and through the check valve 873 which permits the flow of fluid therethrough in this direction as already mentioned. If, however, at the time of resetting, the valve piston 850 occupies a position above that in which it is shown in Fig. 12, the consequent downward movement thereof will tend to create a vacuum in the chamber 839, under the influence of which fluid will pass from the passage 45 into the chamber 839, said fluid passing through the passages 882, 881 and 870 and through the check valve 885 which is arranged to readily open to permit the flow of fluid in this direction.

The plunger 868 will also be reset to its position of Fig. 12 substantially instantly upon substantial equalization of pressures in the opposite ends of the bore 861. The fluid in advance of the plunger 868 as it is thus moved toward the left during such resetting passes out quickly and against substantially little resistance into the chamber 838, said fluid passing through the passages 875, 871 and 872 and through the check valve 876 which is arranged to open to permit the passing of fluid therethrough in this direction.

It will be understood that the pilot or operator may reset the valve piston 850 and the plunger 868 to their positions of Fig. 12 as often as desired by, for example, connecting the conduit 16 with the exhaust conduit 18. For each such resetting the circuit guard valve means 830 of Fig. 12 will permit a controlled and limited or substantially predetermined volume of fluid to pass from the chamber 838 into the bore 841 unless the pressure in said bore 841 is built up to the value required to move the valve piston 850 upward from its position of Fig. 12, to thereby provide substantially unrestricted flow of fluid therethrough with little or substantially no resistance to flow.

In the direction of fluid flow opposite to that just considered, that is to say, when fluid passes from the bore 841 into the chamber 838, as, for example, when fluid is being exhausted through the conduit 16 by the motor B of Fig. 1, the fluid in the bore 841 acts upon the lower end of the valve piston 850 and moves said valve piston 850 upward from its position of Fig. 12. With the conduit 16 connected with the exhaust conduit 18 of Fig. 1, substantially no pressure exists in the chamber 838 and the principal resistance to upward movement of the valve piston 850 is that presented by the spring 73, which may be made relatively small.

The view of Fig. 13 illustrates modified means for controlling the admission of pressure fluid to the chamber 839 of the circuit guard valve means 830 to thereby control the downward movement of the valve piston 850 from the position in which it is shown to its extreme downward or fully closed position and thus provide the desired interval of restricted fluid connection between the chamber 838 and the bore 841 before said valve piston cuts off communication therebetween. With the modified means illustrated in Fig. 13 the above mentioned interval is provided by causing the valve piston to be moved downward at a controlled and usually relatively slow rate of movement as said valve piston moves from the position in which it is shown to its fully closed position.

As in the embodiment of Fig. 12, however, the arrangement of Fig. 13 is such that the valve piston 850 will be moved quickly upward from the positon in which it is shown and toward its fully open position whenever the required pressure exists in the bore 841. It will be understood that the pressure just mentioned may be built up in the chamber or bore 841 by fluid passing into said bore from the chamber 838 through the restricted connection therebetween provided by the clearance space intermediate the shoulder 854 and the throat 842, as in the arrangement of Fig. 12. Upon upward movement of the valve piston 850 fluid passes out of the chamber 839 into the chamber 838 through the passages 890, 891 and 892 and through the check valve 893 in the passage 891 which permits the flow of fluid therethrough in this direction only.

For purposes of further explanation it will be assumed that the valve piston 850 occupies the position in which it is shown and that the same conditions exist as were assumed for purposes of explanation in connection with the arrangement of Fig. 12. Under these conditions pressure fluid from the chamber 838 passes into the chamber 839, the path of flow including the passages 892, 894 and 890. The passage 894 is provided with a restriction which is here schematically shown as a variable orifice 895 which may be adjusted or opened to any desired extent as by the schematically illustrated means 896. Fluid is prevented from passing from the passage 890 into the passage 898 by the check valve 897 which permits fluid to pass therethrough only in the opposite direction. The fluid thus entering the chamber 839 will cause the valve piston 850 to move downward and the rate of this downward movement of the valve piston 850 is determined by the rapidity with which fluid is admitted to said chamber 839 which in turn is determined and controlled by the restriction or orifice 895, the latter being capable of adjustment to any desired extent in the particular embodiment as above stated. The arrangement is such that the rate at which the orifice 895 permits fluid to enter the chamber 839 causes downward movement of the valve piston 850 at a rate providing the desired interval of restricted fluid connection between the chamber 838 and the bore 841 between the time that said valve piston commences its downward movement from the position in which it is shown until it reaches its fully closed position. As explained in connection with the embodiment of Fig. 12, however, this interval is modified conformably with change in the rapidity with which fluid passes through the restricted connection between the chamber 838 and the bore 841, and this is the case regardless of whether the change in the rate of flow through this restricted connection is caused by change in viscosity of the circulated fluid or by change in the pressure existing in the chamber 838. The arrangement of Fig. 13 thus controls and limits to a substantially predetermined volume the maximum volume of fluid that may pass from the chamber 838 into the bore 841 for each resetting of the valve piston 850 unless, of course, said valve piston is moved upward by pressure built up in the bore 841 as will be fully understood from previous explanations. It will also be understood that the valve piston 850 will be reset to the position in which it is shown whenever the pressures in the chamber 838 and the bore 841 are substantially equalized at a pressure below a predetermined value and that said valve piston may be reset by the pilot or operator as often as desired.

Upon downward movement of the valve piston 850 from a position above that in which it is shown, fluid may pass into the chamber 839 from the passage 45, such fluid passing through the passages 898 and 899 and through the check valve 897.

The modified means of Fig. 13 thus functions in substantially the same manner as the means of Fig. 12 except, of course, that with the arrangement of Fig. 13 the valve piston 850 moves downward at a controlled and usually relatively slow rate of movement as it moves from the position in which it is shown to its fully closed position to thereby provide the desired interval of restricted fluid connection between the chamber 838 and the bore 841 as above explained.

As in embodiments previously described, the valve piston 850 of Figs. 12 and 13 will be reset or biased to the position in which it is shown upon rupture of the portion of the circuit or system directly connected with the bore or chamber 841 and consequent drop on the pressure in the conduit 16 below the value determined by the spring 73. If the portion 16—A of the conduit 16 is connected with the supply conduit 15 at the time of such rupture, the circuit guard valve means 830 will function in the same manner as explained in the foregoing explanations in which it was assumed that connection had just been established between the supply conduit 15 and the portion 16—A of the conduit 16, the circuit guard valve means 830 limiting the volume of fluid that may unintentionally escape from the outgoing conduit in the event of such rupture as will be understood from previous explanations.

Each of the embodiments illustrated has its particular advantage, some of which have been pointed out. In all embodiments, however, loss of fluid from the outgoing conduit is limited in the event of rupture thereof and the volume permitted to escape in such event is controlled, assuring that the available supply of fluid in the system or circuit will not be seriously depleted. Also in all embodiments the valve piston means moves to its fully open position where it presents little or no resistance to flow whenever the requisite pressure exists in the conduit with which it is connected.

While the present invention has been described and is particularly well suited for use in connection with a system employing a liquid, such, for example, as oil, as the circulated fluid, it is understood that certain features thereof may also be employed in connection with systems in which the circulated fluid is a compressible fluid such, for example, as gas or steam. When used in connection with a system in which steam is the circulated fluid the advantages provided include not only the safeguarding of the system against depletion in the event of the rupture of a line or conduit but also include the more important advantage of safeguarding against the injury to personnel and the damage to other equipment that might be caused by the uncontrolled escape of steam through a rupture in the line or conduit.

It will be understood that the foregoing are merely exemplifying disclosures and that changes, some of which have been indicated, may be made without departing from the applicant's invention which is defined in the appended claims. For example, the arrangements illustrated in Figs. 7, 8 and 9 may be made such, as by correlating and proportioning the areas, spring forces, etc., that the valve piston means of the units 430, 430' or 530', as the case may be, can not be moved toward or held in their fully open position by the maximum pressure that exists in either the conduit 16 or the conduit 17 and such that said valve piston means can be moved upward toward or held in said fully open position only when pressure exists in both of said conduits 16 and 17.

I claim:

1. In means for controlling fluid flow in a fluid pressure line, the combination of a valve housing having an inlet chamber and an outlet chamber, movable valve means comprising at least one member for controlling the flow of fluid from said inlet chamber to said outlet chamber, said valve means being movable to provide substantially unrestricted fluid connection between said chambers or to completely cut off fluid connection therebetween, said valve means also being movable to provide a restricted fluid connection between said chambers, and means biasing said valve means to provide said restricted fluid connection between said chambers whenever said valve means is moved either to completely cut off fluid connection between said chambers or to provide a substantially unrestricted fluid connection therebetween.

2. In a device for controlling fluid flow in a fluid pressure line, the combination of valve means having at least one element movable to provide a path of substantially unrestricted flow therethrough responsive to pressures above a predetermined value in the portions of the line on the inlet and outlet sides thereof and operative, upon drop of the pressure below a predetermined value in the portion of the line on the outlet side thereof, to first permit a limited volume of fluid to pass into the portion of said line on the outlet side thereof and to then completely close the portion of said line on the inlet side thereof unless the pressure in the portion of said line on the outlet side thereof is increased by admission of said limited volume to a value conformable with the pressure then existing in the portion of said line on the inlet side thereof, and means determining the amount of said limited volume.

3. In a control for limiting the loss of fluid from a fluid pressure line, valve means comprising a valve element movable in response to pressure of a predetermined value in said line to a fully open position providing unrestricted flow through said valve means and means responsive to a lower pressure for limiting the opening through said valve means to a restricted opening and including pressure responsive means for completely closing said restricted connection.

4. In a means for protecting a fluid pressure line against the loss of fluid, a valve control in said line comprising valve means for completely closing the line and including biasing means tending to close said valve means except for a restricted passage and means responsive to the building up of pressure through said restricted passage to overcome the biasing means and open the valve means.

5. In a means for protecting a fluid pressure line against the loss of fluid, a valve control in said line comprising biasing means tending to close said line except for a restricted passage and means responsive to the building up of pressure through said restricted passage to overcome the biasing means and open the line but to completely close the line if there is a break in the portion of said line on the outlet side of said valve control and pressure is not built up therein by fluid admitted thereto through said restricted passage.

6. A means for protecting a fluid pressure line against the loss of fluid upon a break in the line comprising a valve casing having an inlet pressure chamber and an outlet chamber, a piston valve member in said chambers, said piston having an open position to which it is moved responsive to pressure above a predetermined value in at least said outlet chamber and a fully closed position and being biased toward an intermediate position in which the passage between the two chambers is restricted, and means governing the movement of the piston from the intermediate position to said closed position and limiting the volume of fluid passed therethrough upon a break in the portion of said line connected with said outlet chamber.

7. In fluid pressure means of the class described, an inlet chamber, an outlet chamber and means movable to a fully open position responsive to pressure in both of said chambers above a predetermined value and biased into a position to provide a restricted fluid connection between said chambers when the pressure in both of said chambers is below a predetermined value and, upon increase in pressure in said inlet chamber above said predetermined value but without conformable increase in the pressure in said outlet chamber, said means moving during a substantially predetermined interval to permit a substantially predetermined volume of fluid to pass through said restricted connection from said inlet chamber to said outlet chamber and to cut off communication between said chambers at the termination of said interval if pressure is not built up in said outlet chamber by admission of said substantially predetermined volume.

8. In fluid pressure means of the class described, a first chamber, a second chamber, and means controlling communication between said chambers, said last named means including means movable to an open position providing substantially unrestricted fluid connection between said chambers responsive to pressure above a predetermined value in at least said second chamber, and also including means active to limit the connection between said chambers to a restricted fluid connection between said chambers when the pressure in both of said chambers is below a predetermined value and movable, responsive to pressure in said first chamber without conformable increase in pressure in said second chamber, to cut off communication between said chambers after permitting a substantially predetermined volume of fluid to pass through said restricted connection from said first chamber into said second chamber if pressure is not built up in said second chamber by admission of said substantially predetermined volume.

9. In fluid pressure means of the class described, a first chamber, a second chamber, and fluid flow control means for controlling the flow of fluid from said first chamber to said second chamber including means having a portion thereof exposed to substantially atmospheric pressure and movable responsive to the pressure of fluid in at least said second chamber to thereby provide substantially unrestricted fluid connection between said chambers and also including means for admitting to said second chamber a substantially predetermined volume of fluid when the pressure in said first chamber exceeds more than a predetermined amount the pressure in said second chamber immediately following admission of working pressure fluid to said first chamber together with means controlling said substantially predetermined volume.

10. In fluid pressure means of the class described, a first chamber, a second chamber, and fluid flow control means for controlling the flow of fluid including means movable responsive to the pressure of the fluid in at least said second chamber to thereby provide substantially unrestricted fluid connection between said chambers and also including means for maintaining, for a limited interval following admission of working pressure fluid to said first chamber, a restricted fluid connection between said chambers upon increase in the pressure in said first chamber more than a predetermined amount above the pressure in said second chamber.

11. In fluid pressure means of the class described, a first chamber, a second chamber, and fluid flow control means for controlling the flow of fluid including means movable responsive to the pressure of the fluid in at least said second chamber to thereby provide substantially unrestricted fluid connection between said chambers and also including means for first maintaining for a limited interval a restricted fluid connection between said chambers upon drop in pressures in both chambers below predetermined values and subsequent increase in the pressure in said first chamber more than a predetermined amount above the pressure in said second chamber, whereby fluid from said first chamber is admitted to said second chamber through said restricted connection during said interval, and for then cutting off communication between said chambers if the pressure in said second chamber remains below a value conformable with the pressure then existing in said first chamber.

12. In fluid pressure means of the class described, a first chamber, a second chamber and fluid flow means for controlling the flow of fluid from said first chamber into said second chamber, said fluid flow control means including an element biased into an intermediate position in which it provides restricted fluid connection between said chambers when the pressure in both of said chambers is below a predetermined value, said element being movable from said intermediate position in a direction toward its fully open position responsive to increase in pressure in said second chamber and being movable in the opposite direction to cut off connection between said chambers when the pressure in said first chamber exceeds the pressure in said second chamber by a substantially predetermined amount.

13. In fluid pressure means of the class described, a first chamber, means for admitting working pressure fluid directly to said first chamber, a second chamber and fluid flow control means for controlling the flow of fluid from one of said chambers to the other, said fluid flow control means including an element biased into a position intermediate its fully open and its fully closed positions when the pressure in both of said chambers is below a predetermined value, said element being movable from said intermediate position in a direction toward its fully open position responsive to increase in pressure in said second chamber and being movable in the opposite direction to cut off connection between said chambers when the pressure in said first chamber exceeds the pressure in said second chamber by at least a predetermined amount, said fluid flow control means also including means for maintaining said restricted connection between said chamber immediately following admission of working pressure fluid to said first chamber for an interval to permit a limited volume of fluid to pass into said second chamber when the pressure therein remains below a predetermined relation with respect to the pressure then existing in said first chamber and active immediately after the termination of said interval thereafter to cut off connection between said chambers.

14. Fluid flow control means comprising a first chamber arranged to be directly connected with the source of pressure fluid, a second chamber arranged to receive pressure fluid from said first chamber and means controlling the flow of fluid between said chambers including means movable to an open position responsive to pressure in said second chamber to thereby provide substantially unrestricted fluid connection between said chambers and also movable upon increase in the pressure in said first chamber above a predetermined relation with respect to the pressure existing in said second chamber to first admit a limited volume of fluid to said second chamber and immediately thereafter to cut off fluid connection between said chambers unless said substantially unrestricted fluid connection between said chambers is established responsive to pressure in said second chamber built up therein by said limited volume admitted thereto.

15. In fluid pressure means of the class described, a first chamber arranged to be connected with a source of pressure fluid, a second chamber arranged to receive pressure fluid from said first chamber and means controlling the flow of fluid through the first chamber comprising a valve element movable responsive to pressure in at least said second chamber to provide substantially unrestricted fluid connection between said chambers and also movable to a predetermined position responsive to drop in the pressures in both of said chambers below predetermined values to limit the connection between said chambers to a restricted connection therebetween, means for maintaining said restricted connection for an interval to admit a limited volume of fluid to said second chamber through said restricted connection and including means movable through a predetermined distance responsive to pressure in said first chamber to determine the duration of said interval and to effect closing of said restricted connection when said last named means has moved to the end of said predetermined distance.

16. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged portion with one end thereof continuously disposed in said first chamber, said enlarged portion having a diameter greater than that of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is increased due to said restriction, the pressure in said first chamber then acting on the end of said enlarged portion disposed therein and exerting a force on said valve piston tending to move said valve piston into its fully closed position, and a dash-pot piston movable in a dash-pot cylinder and arranged to be engaged by said valve piston during movement thereof from said intermediate position to said fully closed position to thereby retard and control said last named movement of said valve piston whereby a limited volume of fluid is admitted to said second chamber through said restricted connection before said valve piston is moved into its fully closed position.

17. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged portion with one end thereof continuously disposed in said first chamber, said enlarged portion having a diameter greater than that of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is increased due to said restriction, the pressure in said first chamber then acting on the end of said enlarged portion disposed therein and exerting a force on said valve piston tending to move said valve piston into its fully closed position, a dash-pot piston movable in a dash-pot cylinder and arranged to be engaged by said valve piston during movement thereof from said intermediate position to said fully closed position to thereby retard and control said last named movement of said valve piston whereby a limited volume of fluid is admitted to said second chamber through said restricted connection before said valve piston is moved into its fully closed position, and means for resetting said dash-pot piston to a predetermined position immediately upon equalization of pressures in said chambers.

18. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having a substantially cylindrical enlarged portion with one end thereof continuously disposed in said first chamber, said enlarged portion having a diameter greater than that of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is increased due to said restriction, the pressure in said first chamber then acting on the end of said enlarged portion disposed therein and exerting a force on said valve piston tending to move said valve piston into its fully closed position, dash-pot means arranged to retard and control said valve piston during movement thereof from said intermediate position to said fully closed position whereby a limited volume of fluid is admitted to said second chamber through said restricted connection before said valve piston is moved into its fully closed position.

19. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged tapered portion with one end thereof continuously disposed in said first chamber, the diameter of said enlarged tapered portion increasing toward the end thereof continuously disposed in said first chamber with all diameters of said enlarged tapered portion being greater than the diameter of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is progressively increased due to the progressively increasing restriction of said restricted connection as said valve piston moves toward its fully closed position, the pressure in said first chamber then acting on the end of said enlarged portion disposed therein and exerting a force on said valve piston tending to move said valve piston into its fully closed position, and dash-pot means arranged to retard and control movement of said valve piston from said intermediate position to said fully closed position whereby a limited volume of fluid is admitted to said second chamber through said restricted connection before said valve piston is moved into its fully closed position.

20. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged portion with one end thereof continuously exposed to the pressure in said first chamber, said enlarged portion comprising a narrow head having a diameter greater than that of said stem but less than that of said opening, means active upon drop in pressure in both of said chambers below a predetermined value to bias said valve piston into a position intermediate said fully open and fully closed positions and in which position said head enters said opening to thereby limit connection between said chambers to the restricted connection intermediate said head and said opening, whereby the pressure in said first chamber is increased due to said retriction, the pressure in said first chamber then acting on the end of said head disposed therein and exerting a force on said valve piston tending to move said valve piston into its fully closed position, and dash-pot means arranged to retard and control said valve piston during movement thereof from said intermediate position to said fully closed position whereby a limited volume of fluid is admitted to said second chamber through said restricted connection before said valve piston is moved into its fully closed position.

21. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged portion with one end thereof continuously disposed in said first chamber, said enlarged portion having a diameter greater than that of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is increased due to said restriction, the pressure in said first chamber then acting on the end of said enlarged portion disposed therein and exerting a force on said valve piston tending to move said valve piston into its fully closed position, a dash-pot cylinder, a head on said valve piston axially spaced from said enlarged portion and arranged to cooperate with said dash-pot cylinder to provide dash-pot action during movement of said valve piston from said intermediate position to said fully closed position to thereby retard and control said last named movement of said valve piston whereby a limited volume of fluid is admitted to said second chamber through said restricted connection before said valve piston is moved into its fully closed position.

22. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged portion with one end thereof continuously disposed in said first chamber, said enlarged portion having a diameter greater than that of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is increased due to said restriction, the pressure in said first chamber then acting on the end of said enlarged portion disposed therein and exerting a force on said valve piston tending to move said valve piston into its fully closed position, a dash-pot cylinder, a head on said valve piston axially spaced from said enlarged portion and arranged to cooperate with said dash-pot cylinder to provide dash-pot action during movement of said valve piston from said intermediate position to said fully closed position to thereby retard and control said last named movement of said valve piston whereby a limited volume of fluid is admitted to said second chamber through said restricted connection before said valve piston is moved into its fully closed position, said head entering said dash-pot cylinder when said valve piston is biased into said intermediate position and moving out of said dash-pot cylinder when said valve piston is moved from said intermediate position in a direction toward its fully open position, and means for admitting fluid rapidly to said dash-pot cylinder upon movement of said valve piston in a direction toward its fully open position.

23. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to substantially atmospheric pressure and also having an enlarged portion with one end thereof continuously disposed in said first chamber, said enlarged portion having a diameter greater than that of said stem but less than that of said opening, means active upon drop in pressure in both of said chambers below a predetermined value to bias said valve piston into a position intermediate said fully open and fully closed positions and in which position said enlarged portion enters said opening to thereby limit connection between said chambers to the restricted connection intermediate said enlarged portion and said opening, whereby the pressure in said first chamber is increased due to said restriction, the pressure in said first chamber then acting on the end of said enlarged portion disposed therein and exerting a force on said valve piston tending to move said valve piston into its fully closed position, a dash-pot cylinder having its inner end connected with said second chamber and having its outer end fully closed, a head on said valve piston axially spaced from said enlarged portion and arranged to cooperate with said dash-pot cylinder to provide dash-pot action during movement of said valve piston from said intermediate position to said fully closed position to thereby retard and control said last named movement of said valve piston whereby a limited volume of fluid is admitted to said second chamber through said restricted connection before said valve piston is moved into its fully closed position.

24. In a fluid pressure system, a supply line connected with a source of pressure fluid, a reversible fluid pressure device actuated by pressure fluid supplied thereto from said supply line, interchangeable outgoing and return lines connected with said device, control valve means connected with all of said lines and having an element movable to connect either of said interchangeable lines with said supply line to thereby make it the outgoing line and to simultaneously make the other of said interchangeable lines the return line, valve means disposed in one of said lines for limiting the volume of pressure fluid that may unintentionally escape in the event of a rupture in said system intermediate said last named valve means and said device, said last named valve means including a first chamber, a second chamber receiving working pressure fluid from said first chamber and means controlling the flow of fluid between said chambers including a member movable responsive to pressure in at least said second chamber in a direction toward its fully open position in which substantially unrestricted fluid connection between said chambers is established and movable in the opposite direction toward its fully closed position in which communication between said chambers is cut off, means active to bias said member into a position intermediate said fully open and fully closed positions when the pressures in both of said chambers drop below predetermined values, said member providing restricted fluid connection between said chambers when in said intermediate position and being movable therefrom by action thereon of pressure in said first chamber when the pressure in said first chamber is increased without conformable increase in the pressure in said second chamber, means regulating the rate of movement of said member from said intermediate position to said fully closed position to thereby provide a controlled interval during which fluid passes through said restricted connection into said second chamber, and means movable simultaneously with movement of said element of said control valve means for moving said member in a direction toward its fully open position to re-establish restricted fluid connection between said chambers.

25. Fluid pressure means and system comprising two lines, means disposed in at least one of said lines for limiting the volume of fluid that may unintentionally escape in the event of a rupture in the portion of the corresponding line on the outlet side of said means comprising valve means having a first chamber connected with and arranged to receive fluid from the line in which said means is disposed, a second chamber arranged to receive fluid from said first chamber, a third chamber wholly disconnected from said first and second chambers and from the line connected with said first chamber but having fluid connection with the other of said lines and means controlling the flow of fluid between said first and second chambers including means movable responsive to pressure in either of said lines to provide substantially unrestricted fluid connection between said first and second chambers and active upon drop in pressure in both of said second and third chambers below predetermined values to cut off communication between said first and second chambers and also including means for admitting a limited volume of fluid to said second chamber from said first chamber prior to complete cut off of fluid connection therebetween.

26. Fluid pressure means and system comprising two lines, means disposed in at least one of said lines for limiting the volume of fluid that may unintentionally escape in the event of a break in the portion of the corresponding line on the outlet side of said means comprising valve means having a first chamber connected with and receiving fluid from the line in which said means is disposed, a second chamber receiving fluid from said first chamber and also connected with said last named line, a third chamber having fluid connection only with the other of said lines and means controlling the flow of fluid between said first and second chambers including piston means having a fully open position in which substantially unrestricted fluid connection is provided between said first and second chambers and a fully closed position in which fluid connection between said chambers is cut off, means biasing said piston means to a position intermediate said fully open and fully closed positions thereof when the pressures in all of said chambers are below predetermined values, said piston means providing restricted fluid connection between said first and second chamber in any position of said piston means between said intermediate and fully closed positions thereof, said piston means when in said intermediate position being subject to opposing forces exerted thereon by pressure fluid in said chambers, one of said forces comprising the combined force exerted thereon by pressure fluid in said second and third chambers tending to move said piston means toward said fully open position and the other of said forces comprising the force exerted thereon by pressure fluid in said first chamber tending to move said piston means to said fully closed position, and means controlling the movement of said piston means under influence of said last named force from said intermediate position to said fully closed position to thereby provide a controlled interval of restricted fluid connection between said chambers.

27. In fluid pressure means of the class described, a housing having a first chamber arranged to be connected with a supply of pressure fluid, a second chamber in said housing receiving pressure fluid from said first chamber, means controlling the flow of fluid between said first and second chambers comprising an opening between said first and second chambers, a valve piston movable in one direction toward its fully closed position in which it cuts off connection between said first and second chambers and movable in the opposite direction toward its fully open position when the pressure in at least said second chamber exceeds a predetermined value, said valve piston establishing substantially unrestricted fluid connection between said first and second chambers when in said fully open position, said valve piston having an end portion, a stem and a body portion intermediate said end portion and said stem, the diameter of said end portion being less than the diameter of said body portion but greater than the diameter of said stem, a third chamber in said housing separated from said first chamber by the body portion of said valve piston, said stem portion extending outward from said third chamber and having its outer end exposed to substantially atmospheric pressure, means active upon drop in pressures in said first and second chambers below predetermined values to bias said valve piston into a position intermediate its fully open and fully closed positions and in which said end portion cooperates with said opening to provide a restricted fluid connection between said first and second chambers, whereby the pressure in said first chamber is increased due to said restriction, and means controlling the admission of fluid to and discharge of fluid from said third chamber including means active to permit rapid discharge of fluid from said third chamber when the pressure therein exceeds the pressure in said first chamber, means for rapidly admitting fluid to said third chamber when the pressure therein is less than the pressure in said second chamber and means preventing either admission of fluid to or discharge of fluid from said third chamber during an interval when said valve piston occupies said intermediate position, the pressure in said third chamber being less than the pressure in said first chamber but greater than the pressure in said second chamber during said interval, said valve piston being held substantially stationary in said intermediate position during said interval whereby a substantially predetermined volume of fluid passes from said first chamber into said second chamber during said interval, said last named means also being active upon termination of said interval to rapidly move said valve piston into its fully closed position.

28. In fluid pressure means of the class described, a housing having a first chamber arranged to be connected with a supply of pressure fluid, a second chamber in said housing receiving pressure fluid from said first chamber, means controlling the flow of fluid between said first and second chambers comprising an opening between said first and second chambers, a valve piston movable in one direction toward its fully closed position in which it cuts off connection between said first and second chambers and movable in the opposite direction toward its fully open position when the pressure in at least said second chamber exceeds a predetermined value, said valve piston establishing substantially unrestricted fluid connection between said first and second chambers when in said fully open position, said valve piston having an end portion, a stem and a body portion intermediate said end portion and said stem, the diameter of said end portion being less than the diameter of said body portion but greater than the diameter of said stem, a third chamber in said housing separated from said first chamber by the body portion of said valve piston, said stem portion extending outward from said third chamber and having its outer end exposed to substantially atmospheric pressure, means active upon drop in pressures in said first and second chambers below predetermined values to bias said valve piston into a position intermediate its fully open and fully closed positions and in which said end portion cooperates with said opening to provide a restricted fluid connection between said first and second chambers, whereby the pressure in said first chamber is increased due to said restriction, and means controlling the admission of fluid to and discharge of fluid from said third chamber including means active to permit discharge of fluid from said third chamber when the pressure therein exceeds the pressure in said first chamber, means for rapidly admitting fluid to said third chamber when the pressure therein is less than the pressure in said second chamber and a restricted connection for admitting fluid to said third chamber when the pressure therein is greater than the pressure in said second chamber but less than the pressure in said third chamber to thereby provide an interval of controlled downward movement of said valve piston from said intermediate position to said fully closed position, whereby a substantially predetermined volume of fluid passes from said first chamber into said second chamber during said interval as said valve piston moves toward its fully closed position from said intermediate position.

29. In a fluid pressure system, a fluid pressure line connected with a source of working pressure fluid, fluid loss-limiting means in said line for limiting the volume of working pressure fluid that may escape in the event of a rupture in said line, a fluid actuated device receiving working pressure fluid from said line and operatively connected with a member to be actuated thereby, said device tending to over-run under influence of said member whereby said device operates more rapidly than the operation thereof resulting from the working pressure fluid supplied thereto through said line, a supply of low pressure fluid, a fluid connection for connecting said supply with said line at a point intermediate said loss-limiting means and said device and a check valve in said fluid connection permitting fluid to pass therethrough from said supply to said line but preventing the passing of fluid in the opposite direction, whereby fluid passes from said supply into said line during over-run of said device and said line is kept substantially completely filled with fluid, said loss-limiting means including a pressure-responsive element active after a substantially predetermined interval to shut off the passage of fluid through said loss-limiting means when the pressure on the outlet side of said loss-limiting means drops below a predetermined value and the pressure on the inlet side thereof exceeds the pressure on said outlet side by at least a predetermined amount and said loss-limiting means also including means for controlling and determining said interval whereby said interval exceeds the period of over-run of said device.

30. In a fluid pressure system, a fluid pressure line and valve control in the fluid pressure line comprising means tending to close said line except for a restricted passage and means responsive to a pressure built up through said restricted passage to overcome the means tending to close the line and to open the same but to completely close the line if there is a break therein on the outlet side of said valve control, including manually operable means for opening the line.

31. In fluid pressure means of the class described, a first chamber arranged to be connected with a source of pressure fluid, a second chamber arranged to receive pressure fluid from said first chamber and means controlling the flow of fluid through said first chamber comprising a valve element movable responsive to pressure in at least said second chamber to an open position in which substantially unrestricted fluid connection is provided between said chambers and also movable to a predetermined position responsive to drop in pressures in both of said chambers below predetermined values to limit the connection between said chambers to a restricted connection therebetween, means responsive to pressure in said first chamber in excess of the pressure existing in said second chamber for maintaining said restricted connection for an interval to admit a limited volume of fluid to said second chamber through said restricted connection including means movable through a predetermined distance responsive to pressure in said first chamber to determine the duration of said interval and to effect closing of said restricted connection when said last named means has moved to the end of said predetermined distance, and manually operable means for moving said valve element to and holding it in its open position.

32. In fluid pressure means of the class described, a first chamber arranged to be connected with a source of pressure fluid, a second chamber arranged to receive pressure fluid from said first chamber and means controlling the flow of fluid through said first chamber comprising a first valve element movable responsive to pressure in at least said second chamber to provide substantially unrestricted fluid connection between said chambers and also movable to a closed position responsive to drop in the pressures in both of said chambers below predetermined values, said first valve element including manually operable means for moving said first valve element to and holding it in its open position, a second valve element movable from an open position to a closed position responsive to increase in pressure in said first chamber above the pressure in said second chamber and providing restricted fluid connection between said chambers, means biasing said second valve element into its open position when the pressures in said chambers are substantially equal and means controlling the movement of said second valve element from its open to its closed position to provide an interval of restricted fluid connection between said chambers whereby a substantially predetermined volume of fluid is admitted to said second chamber before said second valve element moves into its fully closed position and cuts off all fluid connection between said chambers.

33. In fluid pressure means of the class described, a first chamber, a second chamber and fluid flow control means for controlling the flow of fluid from said first chamber to said second chamber including means having a portion thereof continuously exposed to a relatively low substantially constant pressure and having an open position in which flow through said first named means is substantially unrestricted, a closed position in which fluid communication is cut off between said first and second chambers and a third position in which a restricted fluid connection is provided between said first and second chambers, and biasing means exerting on said second named means in one position thereof a force supplementary to the force exerted thereon by said relatively low substantially constant pressure and exerting on said second named means in another position thereof a force in opposition to the force exerted thereon by said relatively low substantially constant pressure.

34. Valve control means for a fluid pressure line comprising means having a passage provided with an inlet end and an outlet end connected respectively with portions of said line and pressure responsive means controlling the flow of fluid through said passage including means operative in response to pressure in said line to provide a substantially unrestricted fluid connection through said passage, together with means operative upon decrease in pressure of the fluid in said line below a predetermined value to close said passage except for a restricted connection between said inlet and outlet ends and then operative responsive to pressure built up in said inlet end to completely close said passage if the pressure in said outlet end remains below a value conformable with the pressure existing in said inlet end.

35. In fluid pressure means of the class described, a housing having a first chamber arranged to be connected with a supply of pressure fluid, a second chamber in said housing receiving pressure fluid from said first chamber and valve means controlling the flow of fluid between said chambers, said valve means comprising an opening between said chambers, a valve piston movable in one direction toward its fully closed position in which said piston cuts off connection between said chambers and movable in the opposite direction toward its fully open position responsive to pressure in at least said second chamber, said valve piston establishing substantially unrestricted fluid connection between said chambers in said fully open position, said valve piston having a stem disposed in part in said first chamber and extending outward therefrom with the outer end thereof exposed to a relatively low substantially constant pressure and also having an enlarged portion with one end thereof continuously disposed in said first chamber, said enlarged portion having a diameter greater than said stem, means active to bias said valve piston toward a position intermediate said fully open and fully closed positions in which position one end of said enlarged portion is subject to the pressure in said second chamber and said valve piston limits the fluid connection between said chambers to a restricted connection therebetween, whereby the pressure in said first chamber exceeds the pressure in said second chamber as fluid flows therethrough, the pressure in said first chamber then acting on the end of said enlarged portion disposed therein and exerting a force on said valve piston tending to move said valve piston toward its fully closed position, and means arranged to retard and control the movement of said valve piston from said intermediate position to said fully closed position whereby a substantially predetermined volume of fluid is admitted to said second chamber through said restricted connection before said valve piston is moved into its fully closed position.

36. In fluid pressure means and system comprising a first fluid pressure line, a second fluid pressure line and means disposed in said first line for protecting against the loss of fluid from the outlet portion thereof, the combination of means having a passage connected with inlet and outlet portions of said first line and means regulating the flow of fluid through said passage, said last named means including means movable in response to pressure in either of said lines to provide a substantially unrestricted opening through said passage and active in response to pressure in the inlet portion of said first line to completely close said passage after the flow of a substantially predetermined volume of fluid therethrough whenever the pressures in said second line and in said outlet portion of said first line are below predetermined values.

37. In fluid pressure means and system comprising a first fluid pressure line, a second fluid pressure line and flow control means for protecting against the loss of fluid from said first line, the combination of means having a passage connected with inlet and outlet portions of said first line and means active to close said passage responsive to drop in pressure in the outlet portion of said first line with respect to the pressure in the inlet portion of said first line upon a break in the outlet portion of said first line, said last named means being movable to provide an opening through said passage responsive to pressure in either of said lines.

38. In fluid pressure means and system comprising a first fluid pressure line, a second fluid pressure line and flow control means for said first line, the combination of means having a passage connected with inlet and outlet portions of said first line, said means also having a connection with said second line, valve means subject to the pressures existing in both of said lines and arranged to control the flow of fluid through said passage, and means biasing said valve means to close said passage except for a restricted opening therethrough when the pressures in both of said lines are below predetermined values, said valve means moving to overcome said biasing means and provide a substantially unrestricted opening through said passage responsive either to pressure in the outlet portion of said first line or pressure in said second line, and said valve means also being operative to completely close said passage after a substantially predetermined volume of fluid passes through said restricted opening if the pressure in said outlet portion of said first line is not built up by said substantially predetermined volume to a pressure conformable with the pressure existing in the inlet portion of said first line and if the pressure in said second line is below a predetermined amount.

39. In fluid pressure means and system comprising a first fluid pressure line, a second fluid pressure line and means controlling the flow of fluid through said first line, the combination of a valve housing having a first chamber connected with the inlet portion of said first line, a second chamber arranged to receive fluid from said first chamber and connected with the outlet portion of said first line and a third chamber connected with said second line but without fluid connection with either of said other chambers, valve means controlling the flow of fluid from said first chamber to said second chamber responsive to pressures existing in said chambers, said valve means having an open position providing substantially unrestricted fluid connection between said first and second chambers, a restricting position limiting the connection between said first and second chambers to a restricted fluid connection therebetween and a closed position completely cutting off all fluid connection between said first and second chambers, said valve means moving from said restricting position to said open position responsive to pressure in said second chamber or in said third chamber and also being movable from said restricting position to said closed position responsive to pressure in said first chamber and with the pressures in said second and third chambers below predetermined values, said valve means including means admitting a substantially predetermined volume of fluid to said second chamber through said restricted fluid connection before said valve means is moved into said closed position, and biasing means active to move said valve means into said restricting position whenever the pressures in all of said chambers are below predetermined values.

40. In a fluid pressure system, in combination, an outgoing working pressure line, a return line, valve means disposed in the outgoing line, biasing means tending to move said valve means toward closed position against the pressure in the working pressure line and said valve means being held open by the pressure in the working pressure line, said valve means having a chamber in communication with said return line and also being held in open position by the pressure in said return line, and an overrunning fluid motor supplied with fluid pressure from said outgoing line and exhausting into said return line.

41. Fluid pressure means and system comprising a fluid pressure supply line, a second line, a third line, a directional control valve connected with all of said lines and having an element movable to connect said fluid pressure supply line with either said second line or said third line, fluid loss-limiting means disposed in at least one of said lines for protecting against the loss of fluid from the portion of the system on the outlet side of said means, said fluid loss-limiting means including restricting means movable to provide a restricted fluid connection therethrough, means movable responsive to pressure built up through said restricted connection to provide a substantially unrestricted fluid connection through said fluid loss-limiting means and means coordinated with movement of the movable element of said directional control valve for establishing said restricted connection when said movable element is moved to disconnect said fluid pressure supply line from one of the other of said lines and connect it with the other of said lines.

42. Fluid pressure means and system comprising a fluid pressure supply line, a second line, a third line, a directional control valve connected with all of said lines and having an element movable to connect said fluid pressure supply line with either said second line or said third line, fluid loss-limiting means disposed in a least one of said lines for protecting against the loss of fluid from the portion of the system on the outlet side of said means, said loss-limiting means including flow control means movable to a closed position whereby passage of fluid therethrough is prevented and movable to a restricting position whereby a restricted fluid passage is provided therethrough, and means coordinated with movement of said movable element of said directional control valve for moving said flow control means from said closed position to said restricting position as said movable element is moved to establish connection between said fluid pressure supply line and either of said other lines.

43. In a fluid system having a source of pressure fluid and a device to be actuated by pressure fluid from said source, said system also having interchangeab'e outgoing and return lines connected with said device, the combination of means for controlling the flow of fluid through said lines comprising a selector valve connected with said source of pressure fluid and with both of said lines and having a member movable at will to connect either of said lines with said source to thereby make it the outgoing line to said device and to simultaneously connect the other of said lines with the exhaust to thereby make it the return line for said device, together with means active to limit to a substantially predetermined amount the volume of pressure fluid that may escape in the event of a rupture in whichever of said lines is at the time the outgoing line, said last named means having an element arranged to be actuated simultaneously with movement of the movable member of said selector valve and active to establish at least a restricted fluid connection between said source and said device through whichever of said lines is at the time the outgoing line and said last named means also having means responsive to pressure built up through said restricted passage for establishing a substantially unrestricted fluid connection between said source and said device through said outgoing line.

44. Fluid flow control means having inlet and outlet sides comprising means movable at will to establish a restricted connection between said inlet and outlet sides, means active in response to pressure built up on said outlet side through said restricted passage to provide a substantially unrestricted passage between said inlet and outlet sides and means active to completely cut off fluid connection between said inlet and outlet sides if the pressure in said outlet side is not built up to a value conformable with the pressure in said inlet side by a substantially predetermined volume of fluid admitted through said restricted passage.

45. In fluid pressure means of the class described, a first chamber, a second chamber, and fluid flow control means for controlling the flow of fluid including means movable responsive to the pressure of the fluid in at least said second chamber to thereby provide substantially unrestricted fluid connection between said chambers and also including means for first maintaining for a limited interval a restricted fluid connection between said chambers upon drop in pressures in both chambers below predetermined values and subsequent increase in the pressure in said first chamber more than a predetermined amount above the pressure in said second chamber, whereby fluid from said first chamber is admitted to said second chamber through said restricted connection during said interval, and for then cutting off communication between said chambers if the pressure in said second chamber remains below a value conformable with the pressure then existing in said first chamber, said restricted connection being wholly separate from said unrestricted connection and the flow of fluid therethrough being under control of at least one element separate from the means controlling the flow of fluid through said unrestricted connection.

46. In fluid pressure means of the class described, a first chamber, a second chamber, and fluid flow control means for controlling the flow of fluid including means movable responsive to the pressure of the fluid in at least said second chamber to thereby provide substantially unrestricted fluid connection between said chambers and also including means for first maintaining for a limited interval a restricted fluid connection between said chambers upon drop in pressures in both chambers below predetermined values and subsequent increase in the pressure in said first chamber more than a predetermined amount above the pressure in said second chamber, whereby fluid from said first chamber is admitted to said second chamber through said restricted connection during said interval, and for then cutting off communication between said chambers if the pressure in said second chamber remains below a value conformable with the pressure then existing in said first chamber, the flow of fluid through both said unrestricted and restricted connections being under control of means having at least one element common to both.

CHARLES M. KENDRICK.

REFERENCES CITED

The following references are of record in the file of this patent:

UNITED STATES PATENTS

| Number | Name | Date |
|---|---|---|
| 1,283,061 | Bridgham | Oct. 29, 1918 |
| 1,649,735 | Roschanek | Nov. 15, 1927 |
| 2,095,560 | Vickers | Oct. 12, 1937 |
| 2,151,940 | Rumsey | Mar. 28, 1939 |
| 2,192,778 | Stacy | Mar. 5, 1940 |
| 2,214,290 | Ward | Sept. 10, 1940 |
| 2,238,124 | Mathieson | Apr. 15, 1941 |
| 2,368,852 | Lauck | Feb. 6, 1945 |

FOREIGN PATENTS

| Number | Country | Date |
|---|---|---|
| 125,708 | Germany | Nov. 23, 1901 |